(12) United States Patent
Sherman

(10) Patent No.: US 11,368,197 B1
(45) Date of Patent: Jun. 21, 2022

(54) MULTI-USER MULTIPLE INPUT MULTIPLE OUTPUT (MU-MIMO) SYSTEM AND METHODS

(71) Applicant: BAE Systems Information and Electronic Systems Integration Inc., Nashua, NH (US)

(72) Inventor: Matthew J. Sherman, Succasunna, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/333,190

(22) Filed: May 28, 2021

(51) Int. Cl.
| | |
|---|---|
| H04B 7/04 | (2017.01) |
| H04B 7/0452 | (2017.01) |
| H04B 1/69 | (2011.01) |
| H04W 56/00 | (2009.01) |
| H04W 84/12 | (2009.01) |

(52) U.S. Cl.
CPC ............ *H04B 7/0452* (2013.01); *H04B 1/69* (2013.01); *H04W 56/001* (2013.01); *H04W 84/12* (2013.01)

(58) Field of Classification Search
CPC ..... H04B 7/0452; H04B 1/69; H04W 56/001; H04W 84/12
See application file for complete search history.

(56) References Cited

U.S. PATENT DOCUMENTS

| | | | |
|---|---|---|---|
| 9,548,799 B2 | 1/2017 | Hsu et al. | |
| 10,673,506 B1* | 6/2020 | Dash | H04W 24/02 |
| 2012/0084711 A1* | 4/2012 | Duarte | G06F 3/0482 |
| | | | 715/783 |
| 2016/0373946 A1* | 12/2016 | Lu | H04W 12/08 |
| 2018/0324607 A1* | 11/2018 | Rengarajan | H04W 24/02 |
| 2019/0158975 A1* | 5/2019 | Petersen | H04W 8/18 |

OTHER PUBLICATIONS

DARPA, Broad Agency Announcement, HR001120S0049, Jun. 5, 2020.
DARPA, Resilient Network Distributed Mosaic Communications, Program Overview, Jun. 22, 2020.
(Continued)

*Primary Examiner* — Dac V Ha
(74) *Attorney, Agent, or Firm* — Sand, Sebolt & Wernow LPA

(57) ABSTRACT

The present disclosure relates generally to a network system having multiple users, multiple inputs, and multiple outputs to transmit data from a data source through a link to a data sink. One example of a Multi-user multiple input multiple output (MU-MIMO) system relates to the use of primary transceivers and secondary transceivers in respective networks that effectuate data transmission. The primary transceivers are coupled with a data source and broadcast or transmit the data source signal to a plurality of secondary transceivers in a local area network. The signal is then transmitted over a long link to another set of secondary transceivers that then pass the signal to another primary transceiver. This another primary transceiver is coupled with the data sink to effectuate signal transmission to the data sink. The data is synchronized in manner that requires minimal processing and does not require closed loop phase control.

29 Claims, 5 Drawing Sheets

(56) References Cited

OTHER PUBLICATIONS

Northrop Grumman, "Understanding Voice and Data Link Networking", Northrop Grumman's Guide to Secure Tactical Data Links, Dec. 2014. San Diego, CA.

H. Noh et al., "Code selection approach for partitioned cyclic code shift keying to improve multinet capability," MILCOM 2015—2015 IEEE Military Communications Conference, Tampa, FL, 2015, pp. 836-841.

* cited by examiner

MULTI-USER MULTIPLE INPUT MULTIPLE OUTPUT (MU-MIMO) SYSTEM AND METHODS

TECHNICAL FIELD

The present disclosure relates generally to a network system having multiple users, multiple inputs, and multiple outputs to transmit data from a data source through a link to a data sink. One example of the present disclosure relates to the use of primary transceivers and secondary transceivers in respective networks that effectuate data transmission.

BACKGROUND

As taught by U.S. Pat. No. 9,548,799, the use of multiple transmit/receive antennas in wireless networks promises mitigation of interference and high spectral efficiencies through concentrating signals along a designated direction or transmission path. Compared to single-antenna-to-single-antenna transmissions, transmit beamforming may yield increased range (e.g., an N-fold increase for free space propagation), increased rate, increased power efficiency (e.g., an N-fold decrease in the net transmitted power for a fixed received power), and/or may allow splitting a high data-rate stream into multiple lower data-rate streams. N is the number of cooperative nodes or antenna elements at the transmit side.

Distributed coherent RF transmit beamforming is a form of cooperative communication in which two or more information sources simultaneously transmit a common message, controlling the phase and delay of their transmissions so that the signals constructively combine at an intended destination. The term "beamforming" may also be used to indicate what is more commonly referred to as directional beamforming. In this case the information sources are configured to produce a beam that is approximately collimated in a given direction and the beam is not specifically focused to maximize power at any one location, but only in one direction. Phased arrays where the locations of the individual elements and the target receiver are known, where the array elements are interconnected with cables or other calibrated interconnections, and where a common centralized clock/time reference can be distributed among the array elements, can be configured to operate in such directional beamforming mode.

However, decentralized arrays, where the nodes are independent untethered devices with independent clocks i.e., without distributed clock or frequency reference, and where the positional coordinates are unknown, are much more difficult to use as coherent phased arrays, either in transmit mode or receive mode. For such systems of devices to operate as phased arrays, they should perform two major tasks.

First, the phased array should acquire the correct channel information between the array members and the intended target/source and provide a mechanism for the nodes to transmit/receive a correctly weighted signal at each of the array elements so that beamforming is achieved to within an accuracy required by the system.

Second, the phased array should implement a distributed algorithm across the members of the array that enables the array to operate in a coherent manner, providing phase, frequency, and time alignment of the clocks and oscillators of the different array members of the array. A correct method of producing this coordination of the array members is essential to the correct operation of the phased array.

Since multiple clocks are used across the array, the algorithm should operate fast enough to provide the required alignment within time limits determined by the clock coherence. Even with atomic clocks, the clock coherence limit is eventually reached. In a phased array, exceeding the coherence limit may manifest as a random scrambling of the phases of the carrier waves utilized in the beamforming and hence a failure to achieve optimal or even minimally acceptable performance. To correct for this, the algorithm should be compatible with the requirement that the system alignment be periodically refreshed to compensate for limited clock coherence and for operation of the array in dynamic and changing channels.

Another desirable characteristic is that the algorithm be capable of aligning the system (array members/elements/nodes) in a manner that minimizes the required information sharing and other communication between the array members.

By way of additional background, there are now nodes that are able to operate using multi-user multiple input multiple output (MU-MIMO) technology are in many different types and forms. One exemplary MU-MIMO technology uses antennas tiled like a mosaic. In the antenna tile mosaic configuration, antennas are networked, even when they are not in the same place; specifically, phased array antennas and the elements of the phased array that are placed on different platforms and different locations. In this configuration, the antenna elements of the phased array need to operate as one antenna. This problem can prove difficult because antennas are not normally broken down or decoupled into elements on different platforms. While phased array antennas on a single platform can somewhat perform this capability, the relationship between the respective elements in the phased array antenna are known to the antenna designer relative to each other. Therefore, an antenna designer is able to compensate to make the phased antenna array operate efficiently. However, another issue arises when the antenna elements are scattered on different platforms that may move relative to each other or the locations of the antenna elements may not be exactly be known. Thus, issues continue to exist with phased array antennas and other types of antennas where multiple antenna elements are needed to form an array but the platforms that carry each of the respective antenna elements may not be the same and may be moving relative to each other such that the known spacing parameters or distances between the antenna elements may vary. This creates problems in calculations for developing the antenna.

In antenna technology, there are sparse arrays and there are dense arrays. Typically, the limiter is $\lambda/2$. If the elements are sufficiently close (less than $\lambda/2$), then an antenna designer can constrain the pattern in all directions at once. If the elements are too far apart (more than $\lambda/2$), then they may not be constrained all at once. However, it is possible to constrain the beam pattern in specific directions, but the number of directions that a designer may constrain is limited to the number of elements in the array. Thus, if there are N elements in an array, then there may be N constrained points in a beam pattern. In between those points, it can be estimated what the antenna will do or how it will behave but it has to be fully controlled.

MU-MIMO technology traditionally works in a sparse array context. In this situation, the antenna elements are far enough apart that an antenna designer cannot fully control the antenna pattern in all directions. Thus, a problem arises when sparse array antenna designs are desired and the antenna designer wants to be able to constrain the beam pattern in all directions at once.

Irrespective of the type of array that is used, the resultant beam shape at the receiver may resemble a phased-array radiation pattern, with one main lobe and multiple undesired side lobes that cause interference. In conventional phased-array systems, it may also be difficult or impossible to support coherent addition of wave-fronts in multipath (MP) environments, and most beamforming approaches assume line-of-sight (LoS) links between transmitters and receiver.

The problem of array alignment becomes rather difficult when the individual member of the transmitter array are free to move with respect to each other, and do not share a common local oscillator (LO) reference, because the phases/frequencies may vary from one array member to another, and because the timing of transmission may change as the elements move with respect to each other and with respect to the receiver, as is typical in dynamic environments. The movements and changes in the channel may seriously degrade the alignment required for reliable collaborative communications in an ad hoc array system.

U.S. Pat. No. 9,548,799 sought to address some previous needs for improved communication techniques for distributed coherent communications. Namely, this taught that dynamic, untethered array nodes are frequency, phase, and time aligned, and used to focus their transmissions of the same data coherently on a target, using time reversal. The alignment was achieved separately for the radio frequency (RF) carriers and the data envelopes. Carrier alignment was done by phase conjugation. The data was distributed across the nodes. Data distribution and/or alignment was performed by a Master node of the array. The nodes captured a sounding signal from the target, in the same time window. Each node converted the captured sounding signal to baseband, for example, using in-phase/quadrature down conversion. Each node stored the baseband samples of the sounding pulse. Each node convolved time-reversed samples of the sounding signal with the data, and upconverted the convolved data to radio frequency. The nodes emitted their respective convolved and upconverted data so that the emissions focus coherently at the target.

SUMMARY

The previous teachings can still be improved. Namely, a need continues to exist for coherent transmissions that are minimally synchronized with no closed loop phase control. Thus, issues continue to exist in the art and there is a need for improved communication techniques for distributed coherent communications, and for apparatus, methods, and articles of manufacture enabling such improved communications. Needs exist in the art for phase/frequency synchronization techniques that can be used in ad hoc nodes of a distributed transmitter array for coherent transmissions.

The present disclosure addresses these and other issues to solve some of the problems associated with distributed antenna elements on different platforms that need to cooperate as an antenna array to form an antenna where the relationship or distance between respective antenna elements is either not known or may vary over time.

The present disclosure addresses these and other issues by providing Multi-User Multiple input Multiple Output (MU-MIMO) system wherein data is synchronized in manner that requires minimal processing and does not require closed loop phase control. This enables the gains of the MU-MIMO systems to have less complexity and greater flexibility in spectrum selection.

In one aspect, an exemplary embodiment of the present disclosure may provide a Multi-User Multiple input Multiple Output (MU-MIMO) system comprising: a data source; a first network comprising a first gold tile transceiver and a first plurality of blue tile transceivers, and the first gold tile transceiver in operative communication with the data source; network links in the first network that establish a first wireless local area network (WLAN) for data transmission between the first gold tile transceiver and the first plurality of blue tile transceivers that receive adapted transmit data from the first gold tile transceiver received from the data source; a data sink; a second network comprising a second gold tile transceiver and a second plurality of blue tile transceivers, and the second gold tile transceiver in operative communication with the data sink; a long link wirelessly coupling the first plurality of blue tile transceivers to the second plurality of blue tile transceivers; network links in the second network that establish a second WLAN for data reception at the second plurality of blue tile transceivers that receive adapted data from the first plurality of blue tile transceivers and provide the data to the second gold tile transceiver for transmission to the data sink; wherein the second plurality of blue tile transceivers beam form data to the second gold tile transceiver. This exemplary embodiment or another exemplary embodiment may further provide, wherein the long link includes: a forward long link and a reverse long link that are adapted to bi-directionally transmit data between the first gold tile transceiver and the second gold tile transceiver.

In another aspect, an exemplary embodiment of the present disclosure may provide a MU-MIMO method comprising: coordinating network activity on a first plurality of Blue Tile (BT) transceivers from a first Gold Tile (GT) transceiver via a first Blue Cloud (BC) WLAN for data transmission; receiving data for transmission via an interface at the first GT transceiver; coding the data for transmission on BC WLAN to the first plurality of BT transceivers; sending coordinated transmissions of data from the first plurality of BT transceivers to facilitate reception of data at a second plurality of BT transceivers; synchronizing at least one of time, frequency and phase of the data received at the second plurality of BT transceiver; transmitting from the second plurality of BT transceivers over a second BC WLAN; beam forming a signal representing the data to a second GT transceiver adapted to transfer the data from the first GT transceiver to the second GT transceiver via the first plurality of BT transceivers and the second plurality of BT transceivers. This exemplary method or another exemplary embodiment or method may further include transmitting data symmetrically between the first BC WLAN and second BC WLAN along at least one forward long link and at least one reverse long link adapted to effectuate bi-directional transfer of data between the first GT transceiver and the second GT transceiver. This exemplary method or another exemplary embodiment or method may further include transmitting data along the at least one reverse long link adapted to increase of accuracy one of time, frequency and phase of data transmitted along the at least one forward long link to one of the BT in the second plurality of BT transceivers. This exemplary method or another exemplary embodiment or method may further include effectuating different spread spectrum signals possibly in conjunction with the use of different center frequencies to assist in synchronizing the at least one of time, frequency and phase of the data received at the second plurality of BT transceiver. This exemplary method or another exemplary embodiment or method may further include separating transmission from the first plurality of BT transceivers in separate time slots. This exemplary method or another exemplary embodiment or method may further include detecting the synchronized data at each of the BT transceivers in the second plurality of BT transceivers after having been separated in separate time slots; canceling the synchronized data; weighting at least one remaining data signal at one BT transceiver in the second plurality of BT transceivers to favor a strongest signal at each BT transceiver in the second plurality of BT transceivers.

However, other embodiments may not require such a weighting if there are time slots, or separate frequencies for each transmitter or transceiver. Of time slots, processing logic may save all the slots, detect the pilot(s) signal(s), synchronize the signals using the pilot(s), and add them together with the proper weighting and time delay each. A similar concept works for frequencies too. It is only when the system transmits all the nodes on the same frequency and time slot that the system may want to pick the strongest, and just use said strongest signal. Note that when retransmitting the strongest signal to the primary GT transceiver—the other signals are still present (i.e., signals) and may act as noise. However they should not combine (in general) coherently, so the strongest signal that is correctly aligned with the other strongest signals should provide for an overall gain in SNR. Rake receiver techniques may be used to recover power from some of the noise signals but are not necessarily required. If the primary GT transceiver has multiple antennas, there are additional antenna processing techniques that can be employed to simplify combining of the signals. This embodiment presumes beamforming to a single receive antenna.

Thereafter, aspects of this method may further include adjusting phase frequency and transmission time of the strongest signal received at each BT transceiver in the second plurality of BT transceivers; transmitting the adjusted strongest signal from the second plurality BT transceivers to the second GT transceiver. This exemplary method or another exemplary embodiment or method may further include connecting the second plurality of BT transceivers to a common signal processor; detecting the synchronized data at each of the BT transceivers in the second plurality of BT transceivers; canceling the synchronized data; frequency adjusting the data received at each of the BT transceivers in the second plurality of BT transceivers to a common time reference; combining, coherently, the data received at each of the BT transceivers in the second plurality of BT transceivers to maximize signal quality of the received data and minimize multiple access interference.

This exemplary method or another exemplary embodiment or method may further include detecting the synchronized data at each of the BT transceivers in the second plurality of BT transceivers after effectuating the different spread spectrum signal on different center frequencies; canceling the synchronized data; weighting at least one remaining data signal at one BT transceiver in the second plurality of BT transceivers to favor a strongest signal at each BT transceiver in the second plurality of BT transceivers; adjusting phase and transmission time of the strongest signal received at each BT transceiver in the second plurality of BT transceivers; transmitting the adjusted strongest signal from the second plurality BT transceivers to the second GT transceiver. This exemplary method or another exemplary embodiment or method may further include synchronizing the at least one of time, frequency and phase of the data received at the second plurality of BT transceiver to effectuate coherent combination of received data at the second GT transceiver. This exemplary method or another exemplary embodiment or method may further include transmitting data from the first plurality of BT transceivers on different center frequencies; frequency converting a strongest signal received at the second plurality of BT transceivers to a formed beam at a common frequency in the second BC WLAN; transmitting the synchronized data to the second GT transceiver; processing the synchronized data to determine a preferred weighting and combining metric for the signal received at the second GT transceiver. Although the frequency converting is referenced, another embodiment may provide a method for each receiving BT to detect all the signal at all the center frequencies, synchronize them at baseband for a coherence gain, and the retransmit the combined signal rather than just the strongest. The system would still synchronize the signals transmitted to the gold node with the other BT so that further coherent combining gain is achieved at the GT.

This exemplary method or another exemplary embodiment or method may further include effectuating a different spread spectrum signal on a same center frequency to assist in synchronizing the at least one of time, frequency and phase of the data received at the second plurality of BT transceiver. In some cases (CDL being one of them) there is a "synchronization" header that has enough gain that it may not be necessary to add the spread spectrum signals. This exemplary method or another exemplary embodiment or method may further include connecting the second plurality of BT transceivers to a common signal processor; detecting the synchronized data at each of the BT transceivers in the second plurality of BT transceivers; canceling the synchronized data; time adjusting the data received at each of the BT transceivers in the second plurality of BT transceivers to a common center frequency; and combining, coherently, the data received at each of the BT transceivers in the second plurality of BT transceivers to maximize signal quality of the received data and minimize multiple access interference. This exemplary method or another exemplary embodiment or method may further include wherein time adjusting the data received at each of the BT transceivers in the second plurality of BT transceivers to a common center frequency is accomplished by: translating the data received at each of the BT transceivers in the second plurality of BT transceivers to arrive at the common center frequency. This exemplary method or another exemplary embodiment or method may further include wherein time adjusting the data received at each of the BT transceivers in the second plurality of BT transceivers to a common center frequency is accomplished by: weighting and time adjusting the data received at each of the BT transceivers in the second plurality of BT transceivers to arrive at the common center frequency. This exemplary method or another exemplary embodiment or method may further include transmitting data from the first plurality of BT transceivers at a common center frequency; frequency converting a strongest signal received at the second plurality of BT transceivers to a formed beam at a common frequency in the second BC WLAN; transmitting the synchronized data to the second GT transceiver; processing the synchronized data to determine a preferred weighting and combining metric for the signal received at the second GT transceiver, an relaying those weights back to the second plurality of BT on the second wireless LAN to facilitate beamforming at the second GT.

In yet another aspect, one exemplary embodiment may provide a MU-MIMO method comprising coordinating network activity on a first plurality of blue tile transceivers from a first gold tile transceiver via a first blue cloud WLAN for data transmission; receiving source data for transmission via an interface at the first gold tile transceiver; coding the source data as compressed data for transmission on the first blue cloud WLAN to the first plurality of blue tile transceivers; sending coordinated transmissions of the compressed data as link data from the first plurality of blue tile transceivers to facilitate reception of the data at a second plurality of blue tile transceivers; synchronizing at least one of time, frequency and phase of the data received at the second plurality of blue tile transceiver into synchronized data; transmitting the synchronized data from the second plurality of blue tile transceivers over a second blue cloud WLAN; and beamforming a signal representing the synchronized data to a second gold tile transceiver adapted to transfer the data from the first gold tile transceiver to the second gold tile transceiver via the first plurality of blue tile transceivers and the second plurality of blue tile transceivers.

In yet another aspect, an exemplary embodiment may provide a MU-MIMO system comprising: a data source; a first network comprising a first gold tile transceiver and a first plurality of blue tile transceivers, and the first gold tile transceiver in operative communication with the data source; network links in the first network that establish a first WLAN for data transmission between the first gold tile transceiver and the first plurality of blue tile transceivers that are adapted transmit link data derived from source data from the first gold tile transceiver received from the data source; a data sink; a second network comprising a second gold tile transceiver and a second plurality of blue tile transceivers, and the second gold tile transceiver in operative communication with the data sink; a long link wirelessly coupling the first plurality of blue tile transceivers to the second plurality of blue tile transceivers; network links in the second network that establish a second WLAN for link data reception at the second plurality of blue tile transceivers that are adapted receive link data from the first plurality of blue tile transceivers and provide the link data to the second gold tile transceiver as synchronized data for transmission to the data sink; wherein the second plurality of blue tile transceivers beam form data to the second gold tile transceiver.

In yet another aspect, an exemplary embodiment may provide a MU-MIMO method comprising: coordinating network activity on a first plurality of blue tile transceivers from a first gold tile transceiver via a first blue cloud wireless local area network (WLAN) for data transmission; receiving source data for transmission via an interface at the first gold tile transceiver; coding the source data as link data for transmission on the first blue cloud WLAN to the first plurality of blue tile transceivers; sending coordinated transmissions of link data from the first plurality of blue tile transceivers to facilitate reception of data at least one second blue tile transceiver, wherein the first plurality of blue tile transceivers uses different center frequencies for each respective transmission; synchronizing at least one of time, frequency and phase of the link data received at the at least one second blue tile transceiver to generate synchronized data; and transmitting synchronized data from the at least one second blue tile transceiver over a second blue cloud WLAN network.

In yet another aspect, an exemplary embodiment may provide a MU-MIMO system comprising: a data source; a first network comprising a first gold tile transceiver and a first plurality of blue tile transceivers, and the first gold tile transceiver in operative communication with the data source; network links in the first network that establish a first wireless local area network (WLAN) for data transmission between the first gold tile transceiver and the first plurality of blue tile transceiver that are adapted transmit data from the first gold tile transceiver received from the data source; a data sink; a second network comprising a second gold tile transceiver and at least one second blue tile transceiver, and the second gold tile transceiver in operative communication with the data sink; a long link wirelessly coupling the first plurality of blue tile transceivers to the at least one second blue tile transceiver, wherein the first plurality of blue tile transceivers uses different center frequencies for each respective transmission; and at least one network link in the second network for data reception at the at least one second blue tile transceiver that is adapted receive data from the first plurality of blue tile transceivers and provide the data to the second gold tile transceiver for transmission to the data sink.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
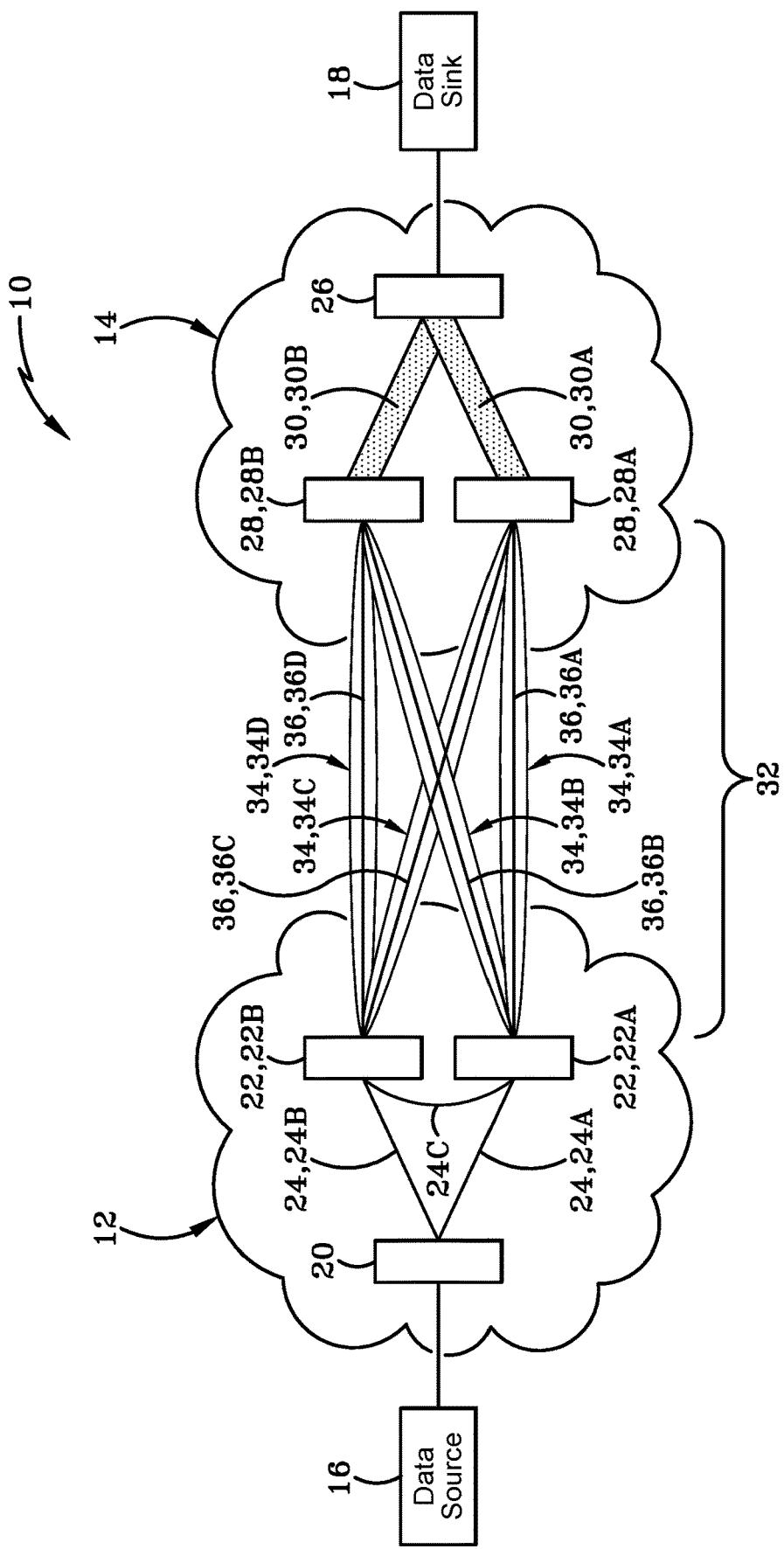
FIG. 1 is a diagrammatic view of a multiple user multiple input multiple output system composed of two networks that are configured to transfer data from a data source to a data sink via a long link.

FIG. 1 depicts a multi-user multiple input multiple output (MU-MIMO) network system generally at 10. The MU-MIMO network system 10 includes a first network 12 and a second network 14. The first network 12 is coupled with or includes a data source 16 that generates source data. Data source 16 includes digital information that is to be transmitted from the first network 12 to the second network 14 in order to provide the digital data to a data sink 18, wherein the data sink 18 is coupled to or included within the second network 14. In one exemplary embodiment, the data source 16 may be a first radio and the data sink 18 may be a second radio. However, any type of digital device that needs to transmit data may be the data source and any digital device that is to receive the data may be the data sink. Alternatively, if a radio, the data source 16 could be "analog" that is converted to digital or other transformations on the data as well to facilitate transmission.

The first network 12 additionally includes at least one primary transceiver 20 and a plurality of secondary transceivers 22. The primary transceiver 20 may also be referred to herein as a "gold tile" (GT). The secondary transceivers 22 may be referred to herein as "blue tiles" or "a blue tile", (BT) as the case may be. In FIG. 1, there is a single gold tile transceiver 20 and two blue tile transceivers 22. Namely, a first blue tile transceiver 22A and a second blue tile transceiver 22B. Although not shown in this figure, additional blue tile transceivers as will be disclosed in other embodiments discussed herein. The gold tile transceiver 20 is networked with the blue tile transceivers 22 via network links 24. More particularly, a first network link 24A couples the gold tile transceiver 20 to the first blue tile transceiver 22A, and a second network link 24B connects the second blue tile transceiver 22B with the gold tile transceiver 20. Additionally, the first and second blue tile transceivers 22A, 22B may be network linked with each other via link 24C. GT Transceiver 20 receives source data from data source 16 and compresses the same to generate compressed data that is transmitted to the first and second blue tile transceivers 22A, 22B.

The second network 14 may include at least one primary transceiver 26, which may also be referred to as a gold tile transceiver. The second network 14 may also include a plurality of secondary transceivers 28, which may also be referred to as blue tile transceivers. In this example, there are two blue tile transceivers 28, namely, a first blue tile transceiver 28A and a second blue tile transceiver 28B. While the number of blue tile transceivers in the second network 14 equals the number of blue tile transceivers in the first network 12, in this example, it is not necessary and there may be a differing number of blue tile transceivers in each respective network 12, 14. The blue tile transceivers 28 are network-linked with the gold tile transceiver 26 and each other using network 14. However, they also include a "beamforming network" from the blue tile transceivers 28 to the gold tile transceiver 26 which enables coherent combining of signals, as synchronized data, at the gold tile transceiver 26. Particularly, according to this example, the network links 30 include a first beam forming network link 30A, which couples the first blue tile transceiver 28A with the gold tile transceiver 26, and a second beam forming network link 30B, which couples the second blue tile transceiver 28B with the gold tile transceiver 26.

The first network 12 may be coupled with the second network 14 via a long link 32 to transmit link data along long link 32. Link data is developed from the compressed data and transmitted from the first and second blue tile transceivers 22A, 22B. As part of the long link 32, there may be a forward long link 34 and a reverse long link 36. More particularly, the long links 32 extend between the blue tile transceivers 22 in the first network 12 to the blue tile transceivers 28 in the second network 14. Namely, there are a number of forward long links 34 and a number of reverse long links 36 that correspond from respective blue tile transceivers 22 to respective blue tile transceivers 28. In one particular embodiment, each respective blue tile transceiver 22 in the first network 12 has a forward long link 34 that couples to one, some, or every blue tile transceiver 28 in the second network 14. FIG. 1 primarily depicts that there is a forward long link 34 from each blue tile transceiver 22 to each blue tile transceiver 28 in the second network 14. For example, forward long link 34A couples the first blue tile transceiver 22A to the first blue tile transceiver 28A. A second forward long link 34B couples the first blue tile transceiver 22A to the second blue tile transceiver 28B. A third forward long link 34C couples the second blue tile transceiver 22B to the first blue tile transceiver 28A. A fourth forward long link 34D couples the second blue tile transceiver 22B to the second blue tile transceiver 28B.

In a similar fashion, the reverse long links 36 may couple one, some, or every blue tile transceiver in one network to those in the other network. For example, a first reverse long link 36A couples the blue tile transceiver 28A with the first blue tile transceiver 22A. A second reverse long link 36B couples the blue tile transceiver 28A to the second blue tile transceiver 22B. A third reverse long link 36C couples the second blue tile transceiver 28B to the first blue tile transceiver 22A. A fourth reverse long link 36D couples the second blue tile transceiver 28B to the second blue tile transceiver 22B.

The first network 12 may be a data local area network (LAN). The data LAN is configured to coordinate time, frequency, and phase of the signals that are to be transmitted from the first network 12 to the second network 14. A second network 14 may be a data LAN. In additional to being a data LAN, the second network may also include a beam former network. To use second network 14 as a beamformer network, the data LAN network is needed to pass beamforming parameters. Thus, at a minimum, the second network 14 is a data LAN. When the second network 14 is a data LAN, the links 30 are wireless links to transmit information between the blue tile transceivers 28 and the gold tile transceiver 26. However, the second network 14 may be a beam former in which the links 30 are formed beams extending between the blue tile transceivers 28 and the gold tile transceiver 26. The beam forming links may be on separate frequencies for the data LAN links. It is additionally possible to implement the first network 12 as a beam former so that both networks 12, 14 enable bi-directional data transmission.

Figure 2A:
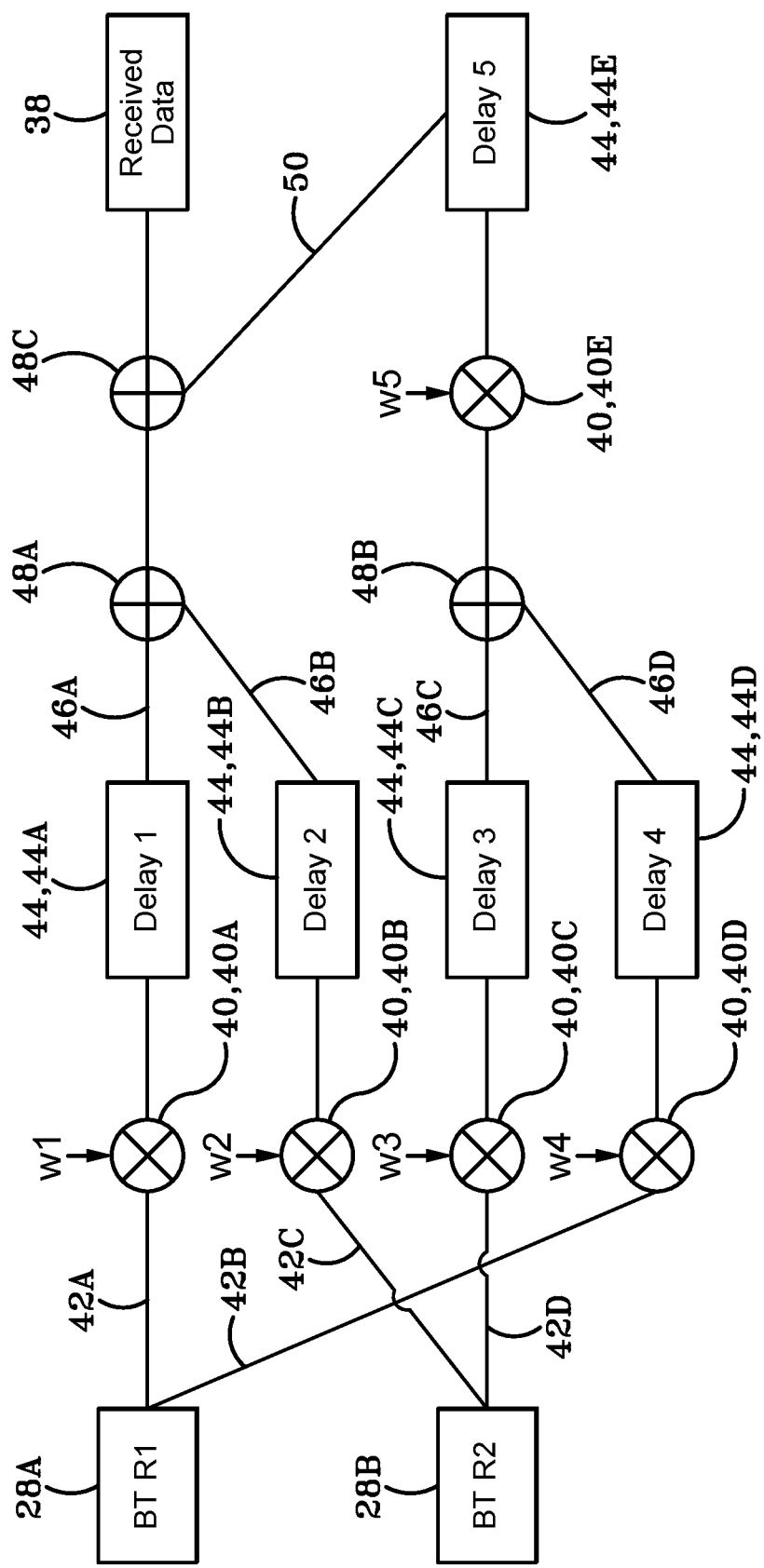
FIG. 2A is a schematic view of exemplary signal processing for networked transceivers in a receiving network.

Prior to a discussion of FIG. 2A, additional background information is provided for complex weights and delays. For Common Data Link (CDL) there is a "header" before each data zone with a synchronization sequence. For a "general signal" (which could be any type of signal), there may be a pilot signal about 10 dB below the information signal that would not prevent decoding of the information signal, but would aid in channel estimation. Generally, the preamble or pilot tone consists of a series of chips. A typical sequence of chips would about 100, however 128 chips and 64 chips are common numbers as well and numbers as large as 1024 or more are not unreasonable. A different pilot or header can be assigned to each user. In the receiver, the pilot or header are "despread" through a correlator to estimate the channel parameters. Some channel parameters are relative delay, frequency offset and phase of the carrier. Once the relative delays, frequency offsets and phases of the pilots or headers are known, the system knows the data bearing signals have the same delay, frequency and phase offsets. The system then align the data signals to be added coherently. There are many approaches to compensating these parameters. If frequency offsets are not too different, then the system uses a complex "weight" (introduced below with respect to FIG. 2A) to correct the phase so that when added together, all the data bearing signals have the same phase. If timing at each antenna is close enough (a fraction of the information symbol period) this may be enough. Otherwise the system delays each resultant signal to improve time alignment. The signals are then added to optimize the signal quality of one signal from each BT receiver. Then the optimized signals are adjusted for relative phase and added for a resultant signal that maximizes signal quality. This is distinct from conventional signal processing that have one data source as now the system has several data sources transmitting the same signal. But the processing is similar to what might be done for multipath signals.

FIG. 2A is a diagrammatic representation of exemplary signal processing for the link data that is being transmitted across the long link 32 that is received by the blue tile transceivers 28. Namely, FIG. 2A depicts the first blue tile transceiver 28A and the second blue tile transceiver 28B and how their processing occurs to coherently combine the received signals into one stream of received data or synchronized data from the link data. The received link data 38 that is coherently combined to create synchronized data through the reception processing of FIG. 2A is provided to the data sink 18 (FIG. 1) through the gold tile transceiver 26 (not shown). The signal processing depicted in FIG. 2A includes the plurality of signal weights 40. Particularly, a first weight 40A, a second weight 40B, a third weight 40C, and a fourth weight 40D. The first weight 40A is in communication with the first blue tile transceiver 28A via line 42A. A second line 42B couples the fourth weight 40D with the first blue tile transceiver 28A. A third line 42C connects the second weight 40B with the second blue tile transceiver 28B. A fourth line 42D couples the third weight 40C with the second blue tile transceiver 28B. Each of the respective weights 40 are multiplied by the signals moving along the respective lines 42 to a delay 44. A first delay 44A is independent of the first weight 40A being multiplied with the signal moving along first line 42A from the first blue tile transceiver 28A. The second delay 44B is independent of the second weight 40B being multiplied with the signal from the second blue tile transceiver 28B moving along line 42C. The third delay 44C is independent of the third weight 40C being multiplied with the signal of the second blue tile transceiver 28B moving along line 42D. The fourth delay 44D is independent of the fourth weight 40D being multiplied with the signal from the first blue tile transceiver 28A moving along line 42B. The output from the first delay 44A and the second delay 44B move along lines 46A and 46B, respectively. The output from the third delay 44C and the fourth delay 44D move along lines 46C and 46D, respectively. The outputs from the first delay 44A and the second delay 44B move along lines 46A, 46B, respectively, to a combiner 48A where the signals are combined. The outputs from the third delay 44C and the fourth delay 44D move along lines 46C, 46D, respectively, to a second combiner 48B where they are combined. The combined signals from the third delay 44C and the fourth delay 44D that are combined in combiner 48B are multiplied by a fifth weight 40E that is electrically downstream from the second combiner 48B. The fifth weight 40E being multiplied with the combined signal from the second combiner 48B results in a product of a fifth delay 44E. The fifth delay creates a signal that is connected with a third combiner 48C via line 50 and combines the product of the fifth delay 44E with the combined signals from the first combiner 48A in the third combiner 48C. With respect to each of the delays, there will be a header signal (Bandwidth Efficient-CDL being an example) or a pilot "underlay" that will allow the values of the weights and delays to be determined with some accuracy. The received signals will then be processed with those values. But all the weights and delays are independently determined. The dispreading of the codes gives the phase and amplitude to be used (relative to an assumed reference time and phase) and the necessary time delays. The third combiner 48C combines coherently all of the signals together to produce the received data 38 that will be ultimately sent to the data sink 18, which may occur in some instances through the gold tile transceiver 26.

In the example of FIG. 2A, there are two copies of the link data signal with different phases and delays, and the system is treating them here as independent signals. Each antenna connected to transceivers 28A and 28B receives a copy of both signals. Notably, in accordance with one exemplary embodiment, the antenna elements may be arbitrarily located. They form what is known in the art as a "sparse" array and there locations may not be tightly controlled. One exemplary constraint on their locations is that they need to be able to communicate with each other, possible through other nodes, so as to synchronize their transmissions and receptions.

The two delays 44A, 44B and weights 40A, 40B are intended to "isolate" the link data signal from transceiver 22A (FIG. 1) from the two delays 44C, 44D and weights 40C, 40D on from transceiver 22A. The signals from the transceivers 22A and 22B are the signals noted at transceiver 28A and 28B. The two signals from transceiver 22A will have a different delay and phase at transceiver 28A. The system detects the delays and phases, and then compensates them. This is accomplished at each receiving antenna, shown in more detail in FIG. 2B. The detection element does the detection, and then sets the weight and delay. In one example, if the systems knows which copy of the signal arrives first, it can do this with a single delay and weight. However, what is shown in FIG. 2A is a general construct since the system does not know which signal arrived first, and the system may want to reference signals to a more general time frame such as GPS time or the start of a slot. Thus, the system might delay both to such a time and have a reference phase that is independent of what is received as well. So for that general case each signal gets its own weight and delay. Once the system isolates the two copies of the data signal (by appropriate combining the signals from transceiver 22A and transceiver 22B possibly with smaller residual noise copies of both signals) the system knows they are identical, and then can add them together. The system knows their relative timing and phasing from the processing already done. So the system delays one of the signals and phase one of signals, and then add them together to get an "optimal" combining of the two signals from transceiver 22A and transceiver 22B.

This teaching can be generalized for more transmitters and receivers. If the system desires or requires a more "general" representation, the system could add a second weight and delay prior to 48C on the signal from transceiver 28A so that other signals are delayed and weighted before being combined. In the first stage, the system is obtaining the best estimate of each independently transmitted signal in the first stage, and then combining all the estimates coherently in the second stage on the right side of FIG. 2A. If all the signals are on the same frequency, the first stage will have an imperfect estimate since the other signals will act as noise. If there is frequency or time diversity between the signals (they don't overlap in one of either time or frequency) then what results is a perfect estimate in the first stage, and optimal gain in the second stage. Note that another approach is to treat this as a "multidimensional rake filter" where each signal on each antenna is treated as "multipath" and then coherently combined. As will be described in greater detail herein, additional examples are provided in which phase diversity between the signals exists and the phase diversity is utilized as a differentiator.

Figure 2B:
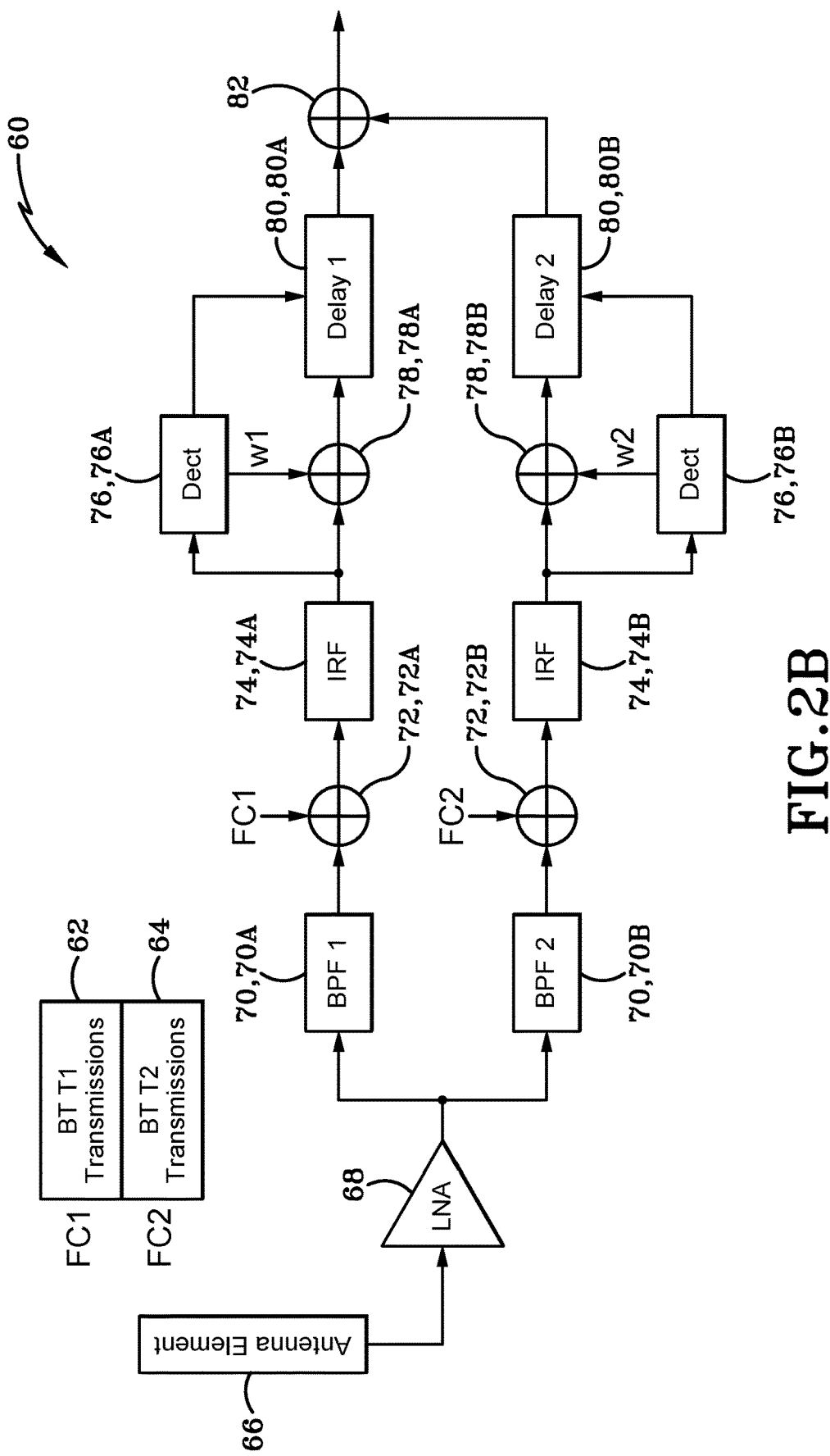
FIG. 2B is a schematic view of exemplary signal processing for a transceiver in the receiving network.

FIG. 2B shows exemplary signal processing 60 for the case where networking of the receiving BT is not possible. It further shows the case where the signals from BT T1 and BT T2 are on separate center frequencies FC1 62 and FC2 64. Both are received and a common antenna element 66 and may be amplified with a common low noise amplifier (LNA) 68. The common antenna element 66 performs processing for a single element. In cases where the receiving elements do not have a broadband connection, there are independently optimized (as shown in FIG. 2B) and then retransmitted to be advantageously combined at another antenna. The separate transmission bands centered on FC1 and FC2 can be separated using band pass filters (BPF) 70 with BPF1 70A in this case selecting the band centered on FC1 and BPF2 70B selecting the band at FC2. The resulting link data signals can be brought to baseband or a common intermediate frequency (IF) using mixers 72, with 72A mixing with FC1, and 72B mixing with FC2. Image rejection filters (IRF) 74, namely first IRF 74A and second IRF 74B, are used to remove undesired mixing products prior to further processing of the signal via 76, 78.

The pilots or preambles present can then be detected by detectors 76 with 76A detecting the signal present on FC1 and 76B detecting the signal on FC2. The detected link data signals reveal the correct phase and delay parameters required for the information bearing signals on FC1 and FC2 to be properly combined. Weights W1,W2 in adders/mixers 78A, 78B, respectively, and Delays 80 are used to adjust the phase and timing accordingly. If a frequency offset were detected by the detectors, that could be corrected as well prior to combining, but is not shown here. Detector 76A controls the value of weight W1 in 78A and Delay 1 80A. Detector 76B controls the value of weight W2 in 78B and Delay 80B.

Once the received baseband link data signals are corrected, the outputs from Delay 1 80A and Delay 2 80B are coherently combined by adder/mixer 82 to create the synchronized data. The resulting synchronized data signal can then be upconverted for transmission and combining with the signals received by the other receiving BT. Other realization of the signal processing with the same effect are possible, and it can be extended to more than two bands on two center frequencies. For example, there can be three received emitters on three separate bands with three separate center frequencies. The same processing shown would be applied to the 3rd band, and then the 3 signals combined. And so on for 4 or more center frequencies. For directional antennas at higher frequencies (Say above 20 GHz) there is a large amount of unused frequency, and it can be advantageously used to simplify the signal processing required to combine the signals as shown here.

Figure 3:
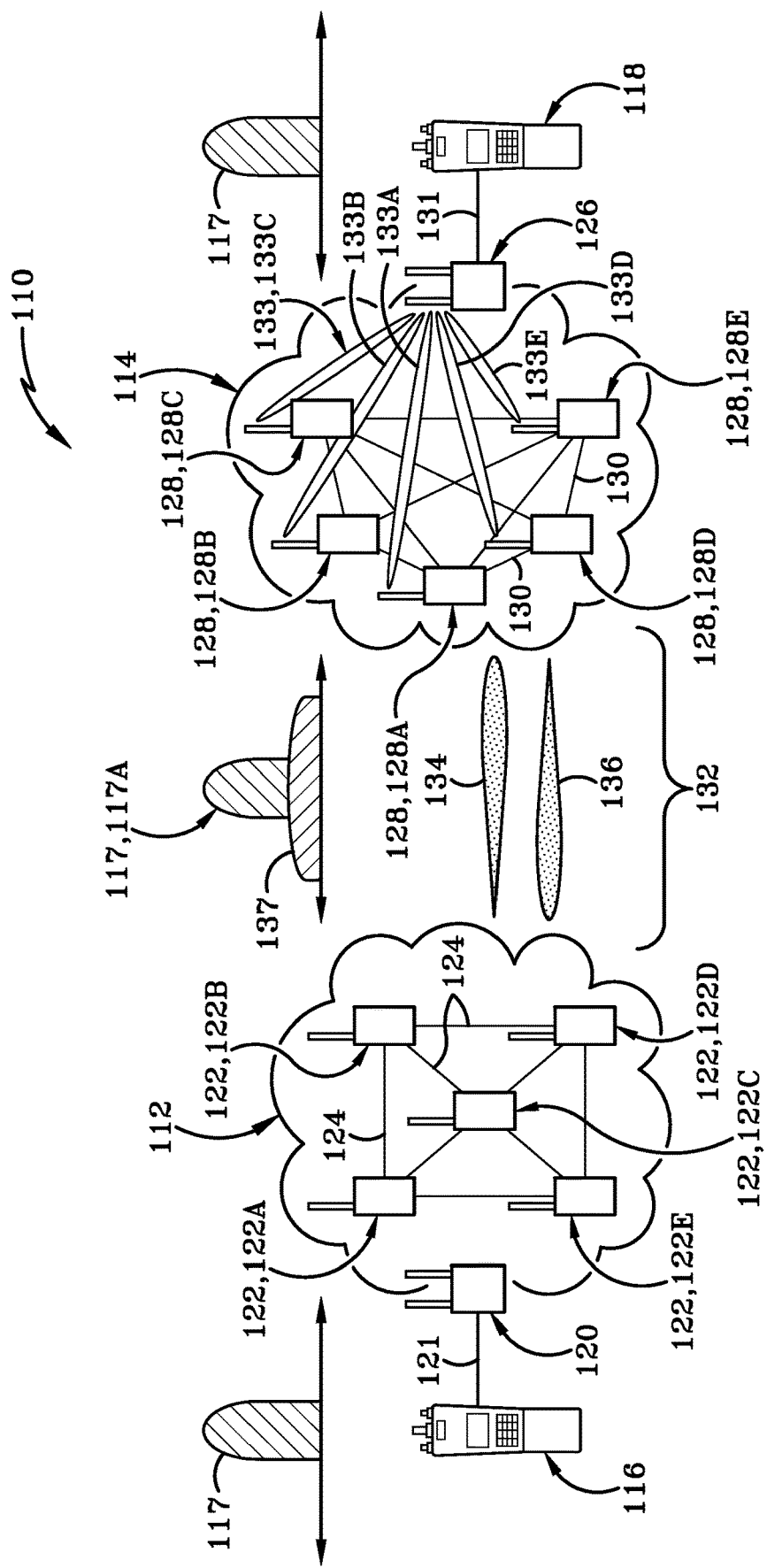
FIG. 3 is a diagrammatic view of a particular embodiment of the multiple user multiple input multiple output system.

FIG. 3 depicts an exemplary instantiation of one aspect of the present disclosure for which the operation makes reference to a resilient networked distributed mosaic communication (RN DMC) which is one specific type of MU-MIMO. The RN DMC MU-MIMO system is shown generally at 110. System 110 includes a first network 112 and a second network 114. A first data source 116 is coupled with the first network 112. In this particular embodiment, the goal for the data source is to transmit its signal or source data, represented as tactical signal 117, to a data sink 118 coupled to the second network 114. The data sink 118 is designed to recover the tactical signal 117, or source data, to complete the transmission of tactical 117 from source 116 to sink 118. Referring back to the data source 116, in this particular exemplary instantiation of the RN DMC, the data source 116 is a conventional radio that does not need to be altered to operate within system 110. Some exemplary tactical signals 117 that are generated by the radio or data source 116 are: TSM, BFT2, SINCARS, Link 16, CDL, DAMA, Bluetooth, WIFI, IoT, LTE, 4G, or 5G.

Within the first network 112 is a primary transceiver 120 that may be a gold tile transceiver. The gold tile transceiver or primary transceiver 120 performs partial demodulation for high link efficiency with relatively low power consumption in operation. In one particular embodiment, the primary transceiver operates with less than 1 watt of power consumption during operation. The gold tile or primary transceiver 120 is coupled with radio or data source 116 via link 121. Link 121 may be any wired or wireless link that allows the primary transceiver 120 to detect and observe the tactical signal 117 generated by the data source 116. The primary transceiver 120 is networked with a plurality of secondary transceivers 122, which are also referred to as blue tile transceivers. The plurality of secondary transceivers 122 are network-linked with each other via network links 124.

In this particular example, there are five secondary transceivers. Namely, a first secondary transceiver 122A, a second secondary transceiver 122B, a third secondary transceiver 122C, a fourth secondary transceiver 122D, and a fifth secondary transceiver 122E. Network links 124 couple, either directly or indirectly, each of the secondary transceivers 122A-122E together. Additionally, a network link couples the primary transceiver 120 to the secondary transceiver 122, either directly or indirectly, within first network 112.

Similar to the first network 112, the second network 114 includes a primary transceiver 126, which may be referred to as a gold tile transceiver, and a plurality of secondary transceivers 128, which may be referred to as blue tile transceivers. In this shown example, there are a plurality of secondary transceivers 128 that equal the same number of secondary transceivers 122 in the first network 112. Namely, there is a first secondary transceiver 128A, a second secondary transceiver 128B, a third secondary transceiver 128C, a fourth secondary transceiver 128D, and a fifth secondary transceiver 128E. Each of the secondary transceivers 128 may be network linked together via links 130, either directly or indirectly. While the number of secondary transceivers in second network 114 equals the number of secondary transceivers in the first network 112, this need not be the case. It is possible for each respective network 112, 114 to have differing numbers of secondary transceivers. The primary transceiver 126 is linked with the data sink 118 via link 131 so that data sink 118 receives the signal 117. It can be wired, or wireless, but should be at the same original center frequency and look exactly like signal 117 transmitted from data source 116 except for delay relative to the original transmission.

The secondary transceivers 128A-128E may be linked with the primary transceiver 126 in any wired or wireless manner. Additionally, the secondary transceivers 128A-128E have beam forming capabilities that can form beams to direct energy or the signal to the primary transceiver 126. The formed beams 133 are directed from an antenna on the secondary transceivers 128 to an antenna on the primary transceiver 126. Namely, a first beam 133A is formed from the first secondary transceiver 128A to the primary transceiver 126. A second formed beam 133B extends from the antenna on the second secondary transceiver 128B to the primary transceiver 126. A third formed beam 133C extends from the antenna on the third secondary transceiver 128C to the antenna on the primary transceiver 126. A fourth formed beam 133D extends from the antenna on the fourth secondary transceiver 128D to the antenna on the primary transceiver 126. A fifth formed beam 133E extends from the antenna on the fifth secondary transceiver 128E to the antenna on the primary transceiver 126. As will be described in greater detail below, the primary transceiver 126 coherently combines the formed beams or the received signal from the secondary transceivers 128 to coherently combine the signal and recover the signal having been transferred along a long link 132 that couples the first network 112 to the second network 114. The second network 114 may be decomposed into a primary sub-network that is a local Data LAN that is used to coordinate transmissions a secondary sub-network that is the beamforming network.

A "conventional solution" would digitize the signals received at 128A-128E and carry them on the primary sub-network and then they would all be conveyed on the primary sub-network to be received at transceiver 126 which would combine them. But this results in an immense data rate on the primary sub-network that may be impractical. Thus, the combining is "orchestrated" by transceiver 126, but actually occurs "over the air" by having each of the nodes 128A-128E phase and time their transmissions 133A-133E to be received so as to automatically combine at the antenna of transceiver 126 so that no actual combining processing is really needed. If the transceiver 126 has multiple antennas additional processing is possible, but the ideal situation is that they combine correctly at a single antenna at 126.

The long link 132 is composed of a forward link 134 and a reverse link 136. The forward long link 134 is configured to transmit link data signals from the first plurality of secondary transceivers 122 in the first network 112 to the second plurality of secondary transceivers 128 in the second network 114. The reverse long link 136 is configured to transmit signals from the second plurality of secondary transceivers 128 in the second network 114 to the first plurality of secondary transceivers 122 in the first network 112.

As will be described in greater detail below with respect to the operation of system 110, the tactical signal 117 that is transmitted from the data source 116 to the data sink 118 is augmented in some manner. In one particular embodiment, the link data signal that traverses the long link 132 is frequency augmented with a shift. The link data signal that is augmented may include a pilot signal 137 that is also fed along the long link 132 in both the forward link 134 and the reverse link 136.

Having described some exemplary configurations of MU-MIMO networks of the present disclosure, reference will now be made to some exemplary advantages and operations.

In operation and with reference to FIG. 1, the first gold tile transceiver 20 receives a signal or source data from the radio or data source 20. The first gold tile transceiver 20 transmits a compressed data signal over a data LAN 24 to the first set or plurality blue tile transceivers 22. The blue tile transceivers are configured with the goal of transmitting a signal from the data source 16 to the data sink 18. The first blue cloud or first network 12 operates on a first frequency (F1) to pass data between the plurality of blue tile transceivers 22. In one embodiment, all of the compressed data from the gold tile transceiver 20 is distributed to the blue tile transceivers 22 in the blue cloud data LAN (BCDL) or first network 12. However, in other embodiments, the data may be filtered or throttle such that only a portion of the data from the gold tile transceiver 20 is distributed to the blue tile transceivers 22 in the blue cloud data LAN (BCDL) or first network 12. Then, the long link (LL) 32 is used to transmit the link data from the first blue cloud or first network 12 to the second blue cloud or second network 14. There is a forward long link (FLL) 34 and a reverse long link (RLL) 36. Each of the links 34, 36 may be on their own respective center frequency. For example, the first blue tile transceiver 22A may be on a first FLL 34A which may be F21 to any subsequent receiving node F2N, where N is any integer. This allows for time slot substitution on the frequencies, if desired.

With continued reference to FIG. 1, in one particular multi-user MIMO system 10, the number of receiving transmitters (i.e., the second plurality of secondary transceivers 28) may have the same number of antennas as transmitters (i.e., the first plurality of secondary transceivers 22) that are transmitting. In one particular example, when the receiving transceivers 28 has the same number of antennas, there is a matrix algebra solution that allows each of the ten signals to be isolated as independent transmissions. This is primarily for the case where all the receiving secondary transceivers 28 have full access to each other's signals (e.g. when they are on the same platform and connected by a high bandwidth LAN—say 10 or 100 Gigabit Ethernet). In the case shown when they are retransmitting over the air to a Gold tile the matrix algebra approach is generally not possible.

Yet, in another example of the present disclosure, this feature may be eliminated because it may be difficult to have that many antennas. This is because the number of elements is less the problem than the communications between the elements. For instance, if in the second network 14 each Blue Tile secondary receiver (i.e., R1, R2, . . . RN) retransmits to the Gold tile primary transceiver 26 on a separate frequency what it received from the long link (34), then all the signals (34A-D) could be on the same center frequency, and the Gold Tile primary transceiver could perform the matrix algebra necessary to separate and recombine them. But that would utilize a significant amount of spectrum if there were ten nodes, though actually not impossible. For example, if the Long link were at 28 GHz (a 5G frequency), and then the "beam former" LAN at 60 or 90 GHz, then enough spectrum could exist to feed all the individual receive BT signals to the Gold tile primary transceiver for combining. But one advantageous method is still that frequency diversity is used on the Long Link, recombined (across all the frequencies at each receive BT second transceiver in accordance with FIG. 4 and then combined again (in phase at the Gold tile receive antenna of the primary transceiver) across all the BT second transceivers. In this case, the beamformer would operate at a single lower frequency (say around 1 GHz) and the gold tile primary transceiver would provide feedback to the blue tiles second transceivers to allow them to coherently combine their signals at the GT receive antenna of the primary transceiver. So two different but related methods. A common frequency for the long link, and separate frequencies for the beam former is one method. Or separate frequencies for the long link, and common frequency for the beam former. The difficulty is not so much the number of antennas, but rather the ability to share information across all the antennas as the number gets large.

Figure 4:
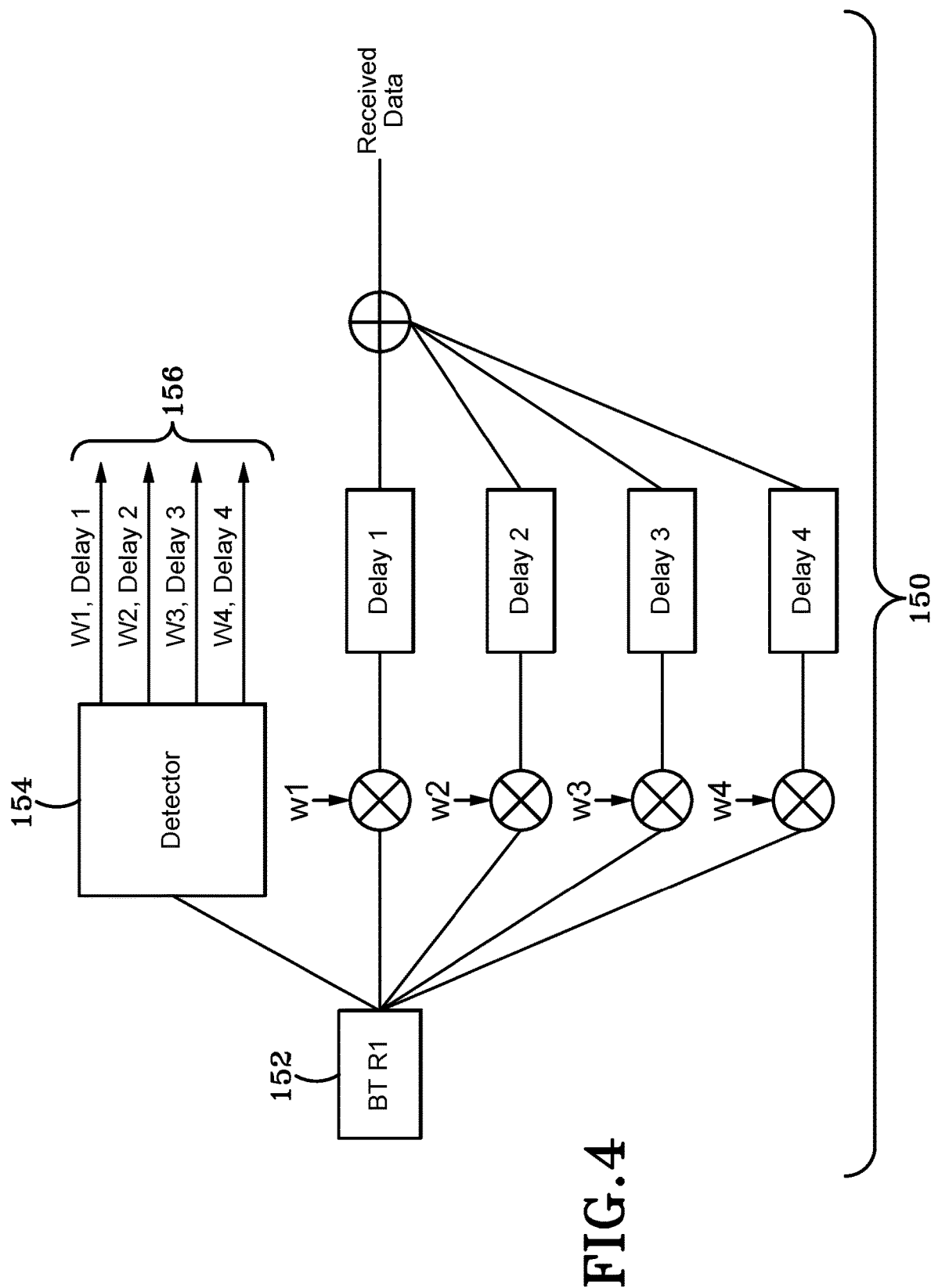
FIG. 4 is another schematic view of exemplary signal processing for a transceiver in the receiving network.

This problem can be eliminated or otherwise solved by allowing each of the secondary transceivers 22, 28 to move to a different long link receive frequency or a different beam former transmit frequency. This allows each of the secondary transceivers 22, 28 to be orthogonal so the matrix algebra (signal separation) step is not required. Instead, the instantiation of system 10 shown in FIG. 1 allows for each of the signals to be phased up inside the secondary transceivers 28 by applying a complex weight to adjust the phase so that when they are combined together they add coherently as shown in FIG. 4. This results in a combined beam that is a MU-MIMO formed beam. Traditionally, frequency has not been used in this fashion to create isolation. Thus, the present disclosure makes it easier by not having ten antennas on each platform (100 total antennas) to separate each of the ten signals with matrix algebra. There are other methods (use of multi-user detection, cyclostationary processing, etc) that can also be applied to still use one antenna per platform.

With continued reference to this example, another gain can be achieved by combining the signal detected or observed on each of the secondary transceivers 28 again at the second primary transceiver 26 or second gold tile. Then, a second step of combining may be accomplished by adjusting the phases. Thus, this example provides a two-step combining process that is simplified by the fact that uses multiple frequencies to orthogonalize the signals coming from the first network 12 (i.e., the transmit side) of the secondary transceivers 22. Note that these two operations can be reversed, with a single frequency being used on the Long Link, 34, and multiple frequencies being used on the Beam forming link, 30, to enable the receive gold tile primary transceiver 26 to apply techniques to isolate individual transmit signals from 22, and combine them into a single coherent signal.

With respect to adjusting the phase in this example, there is a portion of the signal that is already known, namely, the pilot signal. Additionally, there is the information bearing portion of the signal that is transmitted. The information bearing portion of the signal is encoded/modulated such that it cannot be directly transmitted without further information. However, if the pilot and the information bearing signal are put through the same channel, then it is a linear system and they experience identical channel effects. Thus, the transceivers in system 10 listen to the known pilot signal to determine the channel effects (delay, phase offsets, etc) and also knows what the pilot signal is so it can cancelled from the composite signal if needed. Generally the "pilot" can be a known header signal (if the information bearing signal already includes such a header or one can be added) or could be a spread spectrum signal added at a low amplitude relative to the information bearing signal. If small enough, the presence of the pilot can be ignored in the processing of the information bearing signal. The measuring of the pilot signal determines the channel impairments such as phase, frequency and amplitude offset that have been applied to both the pilot and information bearing signal. This processing is done for all of the signals that are received. For example, if there are ten different blue tile, 22, long link signals that are being received then there will be ten pilots and on top of those ten pilots (one for each transmitter 22A, 22B, etc.) will be ten copies of an information bearing signal (one from each transmitter 22A, 22B, etc.) that the system does not necessarily know what they are, but they should be the same except for channel impacts which once compensated allow all of the signals to be combined coherently. In particular, the reference frequency, time, and phase angle for each copy of the information bearing signal must be the same to be coherently combined. Thus, an Arctan calculation is performed to obtain the phase angles at each respective tile to get all of the phase angles to equal each other so the signals may be combined in phase. A complex weight is used to shift the phase of the signals to equal each other through a unitary transform that does not impact the signal other than changing the phase. This allows the signals that are not in phase when received to be combined coherently to obtain the gain of N in signal to noise (SNR) performance.

With continued reference to FIG. 1, signal transmission may desire to be bi-directional. If bi-directionality is required or preferred, then system 10 can be replicated to operate in an opposite direction. While replicating the same infrastructure would be easy to produce, it could be possible to accomplish the bi-directionality of signal transmission through the same infrastructure shown in FIG. 1 with some techniques that would permit the bi-directional transmission. For example, in multi-user detection, the system 10 may overlay two signals and keep them apart because the system understands the properties of each of the respective signals. So, in theory, with the knowledge of how the first network 12 is modulated, that link data signal can be put on top of a synchronized signal for a beam former in the second network 14. However, this may be difficult to do but can be accomplished with full duplex communications or STARS (Simultaneous Transmit and Receive Systems). The full duplexing or STARS may be accomplished using the configuration of FIG. 1 if each of the primary transceivers 20, 26 included a canceller that cancels out the transmitted signals so the primary transceivers 20, 26 can "listen" or receive signals without interruption from the signals it is transmitting from itself. Cancelling the transmitted signals of each of the primary transceivers 20, 26 depends on how low a frequency that the gold tile needs to receive or "listen to".

For example, if the primary transceivers 20, 26 needed to both simultaneously listen and transmit signals with the ability to listen/receive signals at −80 dBm while transmitting at 30 dBm, then signal should be at least 10 dB lower than the receive signals to be processed correctly. In this example, the 30 dBm and 80 dBm results in 110 dB, minus another 10 dB, equals 120 dB. Thus, the transmit signal from each respective primary transceivers 20, 26 must be cancelled by about 120 dB. Typically, there may be about 40 dB of antenna isolation from the transmitted signal if two different antennas are being used, but depends on how small the device is. Receiver saturation techniques must also be considered. For example, if a receiver is trying to listen to a signal at −80 dB but it has cancelled its signal that is coming in at −10 dB, then the system is likely saturating its own LNA. Thus, the power must be reduced so that its own receiver does not get blinded. Often in analog, there will be an isolation loop to reduce another 40 dB. This will get the system down to a total of 80 dB. This means that it is then at −50 dB for its interfering signal at the transmitter that is still trying to get to −90 dB. Thus, the remaining 40 dB can be cancelled digitally.

In operation and with reference to FIG. 2A, an exemplary beamforming technique is provided in the receiving network 14 (but would also be applicable to the second network 114 show in FIG. 3) if the blue tile or secondary transceivers 28A, 28B are co-located or operatively connected to each other via a wire, then then synchronized or coherently combined data signal may be digitized at each receive antenna and the signals may be combined at speeds of up to hundreds gigabits per second. However, when the antennas are wirelessly connected, they do not have that much speed. Thus, FIG. 2A assumes that the transceivers 28A, 28B are wired together and therefore it can do a true beamforming combiner or beam former and separately receive the signals. Thus, as shown in FIG. 2A, first weight 40A and second weight 40B are weights for the transmission signals T1, T2, respectively. To solve for T1, R1 at the first transceiver 28A is multiplied by first weight 40A and R2 at the second transceiver 28B is multiplied by second weight 40B. Each of them is delayed by the proper amount and then combined. This results in leaving T1 as T2 is cancelled out. The other weights, third weight 40C and fourth weight 40D, are multiplied against the T1 from R1 and the T2 from R2, respectively. Namely, T1 from R1 is multiplied with fourth weight 40D and T2 from R2 is multiplied by third weight 40C. Then the signals are sent through their appropriate delays and combined. This solves for T2 as T1 is cancelled out. Then the system may determine whether T1 and T2 are the same signal. If they are the same signal, then it will determine that one is delayed relative to another and then T2 can be multiplied by another weight, namely fifth weight 44E, and delayed appropriately to then be recombined at combiner 48C with T1 to produce the results of the sum of T1 and T2 at the receive data. This example describes an exemplary MIMO beamforming technique.

In operation and with reference to FIG. 3, one exemplary aspect of the present disclosure, and one exemplary advantage of the present disclosure, takes advantage of electromagnetic radiation that operates in a unique way which will allow an antenna designer to utilize equations, processes, methods and/or algorithms. These equations, processes, methods and/or algorithms that allows the antenna designer to take advantage of a non-intuitive effect of when the antenna elements are far enough apart so as to define a sparse array. Namely, when distributing the antenna elements far enough apart in a sparse array, more power on the target is achieved than if the antenna elements were closely together in a dense array. One exemplary motivation for achieving and accomplishing this advantage is by placing a plurality of antenna elements in a group with each antenna element having a power amplifier that is dedicated to each respective antenna element, and the antenna are coherently combined on a specific target, then the power needed from the individual power amplifiers powering the individual elements is less than if a single transmitter would be needed under a traditional transmit power amplifier.

For example, in the traditional scenario, a single transmit power amplifier may be 50 watts. If there are ten antenna elements in a group, according to the present disclosure, the power amplifiers associated with each respective antenna element require only 5 watts each. Thus, there is one exemplary method and system of the present disclosure enables a power saving advantage by taking advantage of electromagnetic propagation equations, processes, methods and/or algorithms through the coherent combination of each of the respective antenna elements to allow less power to be used overall than if a single traditional power amplifier would be used to transmit the same signal. In this exemplary scenario, the $N^2$ gain is really in signal to noise ratio (SNR) and presumes a single receiving antenna with a single noise source. Namely, if there is one antenna, and all the transmit signals arrive in phase at that antenna, then relative to the receiver noise at that antenna, there is an $N^2$ gain in SNR. However, if combined across multiple antennas, each antenna has a different noise source, and the noises are summed together when you sum the various received antenna signals. This increases the noise so that the net gain is only N rather than $N^2$. Further, if the transmitted signals are fully synchronized so they are received at one antenna in phase, it virtually guarantees that they will not be in phase at any of the other antennas. So the $N^2$ gain only works for a single receive antenna. To enable the use of multiple antennas, the technique herein will limit their SNR goals to a gain of "N". Yet still, this allows the present disclosure to transmit with the same effect but with less power as a traditional power amplifier. Thus, the present disclosure takes advantage of power coherence which enables each power amplifier to be added together under a square law such that when noise is factored in, a set of lower power transmitters can linearly add to accomplish the same effect as a single large transmitter.

One exemplary system, RN DMC, operates with specific constraints that are inserted and develops the nomenclature of gold tiles and blue tiles. Gold tiles are interface transceivers (i.e., primary transceivers 120) that receive signals from a radio. The gold tile transceivers transcode the signal from source 116 to make it easier to transmit over the forward and reverse links as 117. Generally the transcoding reduces the information that must be transmitted. In some examples, the augmentation of the signal may add a preamble, a co-channel underlay 137 and subcarriers or even completely transform the signal digitally to support distributed coherent transmission and additional networking and/or telemetry data. These augmentations may be performed at the Blue tiles (122) under control of the gold tile. The blue tiles are transceivers 122 in the antenna tile mosaic that "hear" the gold tile transceiver 120. The blue tile transceivers 122 measure channels and compute phase offsets and then retransmit with the appropriate phase adjustment to form a directional beam towards the remote blue tile transceivers 128. The gold tile transceivers 126 on the receiving end extract the tactical radio waveform from augmented signals and provide it to the tactical radio or data sink 118 on the receive end. The low data rate links between the nodes support computation of relative node positions and RF channel parameters. This collectively allows the transceivers, both blue tile transceivers and gold tile transceivers, to work together to provide distributed coherent gain. In this case "$N^2$" gain may be possible if there is a single antenna at the gold transceiver. However, the "noise floor" is set at the receivers in 128. Each signal, 133, will carry a different noise from receiver 128 in addition to the desired signals. While the desired signals can be combined coherently for $N^2$ over the local noise in receiver 126, the other noise signals in 133 will add non-coherently and limit the gain possible on the Forward Link to N, regardless of the performance of the beam former 133.

The reason for the different names between gold tile transceivers (i.e., the primary transceivers 120, 126) and blue tile transceivers (i.e., the secondary transceivers 122, 128) is that the gold tile transceivers 120, 126 are performing special features and processing that are not on the blue tile transceivers 122, 128 that are all the same. The gold tile transceiver 120, 126 allows, in one particular example, a standard radio, perhaps carried by a soldier in a battlefield but may be any type of standard radio, and the gold tile transceiver is coupled to the standard radio to preprocess the radio signal and distribute to the blue tiles allowing MU-MIMO network communications and antenna techniques to occur. Stated otherwise, the gold tile transceiver 120, 126 acts as a supplemental electric device that is to be coupled with a standard radio such that a conventional radio is not augmented or adjusted by the techniques presented herein. If the blue tiles were to directly couple to the tactical radio at RF, it would be difficult to control the transmission timing of the MIMO signals since the tactical radio may not have provisions for this. Also, it is efficient to do any transcoding required at one location and distribute the transcoded signal to all the blue tiles rather than have the blue tiles have additional hardware to each independently transcode the signal. This would ordinarily create a challenge because one easy solution would be to augment the traditional radio; however, there are situations where augmenting a traditional radio is not possible and a secondary blue tile transceiver must be used in its place. The blue tile transceiver may observe, "snoop", or quietly listen to the standard radio and takes its signal to allow the MU-MIMO techniques discussed herein to be achieved without physically augmenting or disassembling the standard radio that may be carried by a solder or any other person or at installation. However, in one specific embodiment the general expectation is that the Gold tile primary transceiver would be more expensive with additional facilities to process the tactical radio signal, and would do any pre-processing required. However it is also possible for the BT secondary transceivers to listen directly to the signal, and possibly retransmit it in a different band after adding a pilot or some other signal.

The use of the blue tile transceivers 122, 128, according to the aspects and embodiments of the present disclosure, allows the basic MU-MIMO methods and techniques. However, for efficient utilization of those techniques transcoding is required with is generally accomplished through processing on the gold tiles 120, 126. If the blue tiles are in direct RF contact with the tactical radios, 116, 118, then transcoding can instead be done on the blue tiles 122, 128 without need of the gold tiles. Transcoding methods and techniques allow the gold tile transceivers 120, 126 to listen to a standard radio at RF and down convert the signal and then transcode the signal to carry it on a MU-MIMO network. When the gold tile transceivers 120, 126 listens to the standard radio, the gold tile transceivers 120, 126 encodes the radio signal to be carried by a MU-MIMO system. Thus, in order for all of the blue tile transceiver antennas 122, 128 to cohere correctly, the system may establish a particular modulation or may use a particular error correction code or other particular techniques to correct for channel effects that provide an antenna designer freedom for how they wish to design for the transmission of the signal over the air. System 110 of the present disclosure addresses one often challenging limitation associated with not altering the traditional radio and achieves this solution by using the gold tile receiver 120 that listens to the traditional radio signal from radio or source 116 and transforms it to have the most efficient technique in the MU-MIMO system 110.

For example, one thing that can be done by an antenna designer is to listen for the strongest signal from the traditional radio or source 116. If the gold tile transceiver or primary transceiver 120 is placed immediately adjacent the traditional radio 116, the strongest signal that will be observed is likely going to be the radio or source 116. Then, the gold tile transceiver 120 can determine how wide the signal is, such as one megahertz wide. Then, the gold tile transceiver 120 may filter out everything that is outside the exemplary one megahertz-wide bandwidth and bring it to baseband. Then, the signal may be digitized. In this example, presume that the system designer believes that it will need about eight bits of resolution on that signal. Then, if the eight megabits per second is transmitted over the air, then the signal can be represented. If a receiver, such as secondary transceiver 128, receives the eight megabits per second signal on the other side, then the receiver can reconstruct the signal with 8 bits of fidelity. Then, the signal will be sent back up to RF at the signal the gold tile transceiver first heard it and then radiate it so that the radio 118 receives the signal thinks it is listening to the radio 116 on the left when, in fact, they are many, many miles apart. Typically, the radio signals would not be strong enough to connect with each other; however, they were able to connect because of the MU-MIMO network 110 without a system designer actually entering or altering the traditional radios 116, 118. The gold tile transceiver 120 effectively is digitizing the spectrum that one radio or source 116 is transmitting, then transmitting it over the MIMO network, then resynthesizing on the other side of the network and insert it into the other side of the network at the data sink 118. This allows for both radios (i.e. the data source 116 and data sink 118) to talk to each other when done bi-directionally.

In accordance with one aspect of the present disclosure, the gold tile first transceiver 120 observes or detects (or is otherwise able to listen in or "snoop on") the data source or traditional radio in a number of manners. In one particular embodiment, in which is considered a "blind possibility", the radio or data source 116 may be a TSM radio which is a Trellisware radio that uses a very specific modulation format. The TSM radios approximately transmit around 1.7 gigahertz to about 2.3 gigahertz center frequencies; however, it may also be used at 400 megahertz. Thus, there are certain frequencies that the gold tile transceiver will know that the radio or data source will be operating at or in a range. Thus, even though, in this example, the gold tile transceiver 120 does not understand the source data or signal 117 that is transmitted from the data source 116, if the gold tile transceiver 120 listens to the signal once then the gold tile transceiver 120 can fingerprint the signal. For example, the system can analyze cycle frequencies of the signal to understand that it is a TSM signal with 1 megahertz bandwidth. Namely, every manmade signal has "fingerprints" or a digital signature that if the signal is observed or listened to, the specific frequencies that are in it will look and behave with different signatures. For example, a TSM signal will look like one type of signal, a WiFi signal will look like another type of signal, and a cell phone signal will look like another type of signal. Thus, the gold tile transceiver 120 will be able to observe the signal from the data source 116 or radio and identify the type of signal. For example, the gold tile transceiver 120 will be able to identify that the signal is a TSM signal even though transceiver 120 may not exactly know how to demodulate it at that time, but it will know and be able to determine the center frequency of that signal. For example, if the gold tile transceiver 120 determines that the data source or radio is emitting at 1.7 gigahertz, then the gold tile transceiver 120 will be able to listen to or observe the frequency ranges around 1.7 gigahertz and determine whether it observes or "hears" any TSM signals. If the gold tile transceiver 120 observes or detects a TSM signal, then a determination may be made from a look up table that TSM signals are typically about 1 megahertz wide. With the knowledge that it is roughly centered at about 1.7 gigahertz, then a mixer is used to take the signal that is heard at 1.7 gigahertz and mix it down to baseband. Then, a filter isolates the 1 megahertz of bandwidth at 1.7 gigahertz from other frequencies. Once this is performed, another signal is created at baseband in analog format. Then, it is known that if that baseband signal in analog format was placed into another TSM radio, then the receiving TSM radio would understand the TSM signal.

Referring back to the previous example, once the TSM signal has been converted to baseband, it is digitized. The baseband signal must be digitized so it can be modulated onto the MU-MIMO network. Thus, the MU-MIMO network requires a digitized representation of the baseband analog signal. Once the baseband signal has been digitized, it is transmitted over the network to a receiving device, namely, the secondary transceivers 128 or blue tiles in the second network 114. When one of the receiving devices (i.e., secondary transceivers 128) receives the digitized baseband signal, it is converted back to its original analog format at baseband except for minor quantization error. The analog baseband signal received by the receiving device is upconverted to 1.7 gigahertz. Then, the receiving device is able to detect, receive, and understand the signal that has been transmitted as if it was in its original format. This allows the MIMO network to take advantage of not knowing what the signal is, but taking advantage of a few parameters that are known about the signal, such as how much bandwidth it has and its center frequency. If those two characteristics or parameters are determined by the transmit side of the system, then the MIMO system is able to transmit the transcoded signal over the network as the link data or signal 117A, and the original signal 117 reconstructed on the receiving end of the network at the second primary transceiver 126 as the synchronized data.

As depicted in FIG. 3, during the forward transmission of the signal, augmentations such as a pilot signal 137 may be utilized. In one example, a direct sequence spread spectrum signal could be used as the pilot. The direct sequence (DS) signal would be of a known rate and encoding so that it can be properly decoded at receiving radios. A different spreading code would be used by each blue tile transmitting for each DS signal. The signals might be BPSK or QPSK modulated, and convey an information rate of 1 kbps. The information could include information about which blue tile is transmitting and parameters required to properly synchronize a receive signal such as the relative timing of the pilot signal and MU-MIMO signals being transmitted. The pilot might spread the information transmitting by a factor of 1000 giving it 30 dB of spreading gain and perhaps a 1 MHz bandwidth. The spreading could be accomplished using gold codes or random bits with a suitably initialized random bit generator. Each Blue tile would use a different spreading sequence that is known to the receivers. This would enable receivers that hear the pilot to demodulate/decode it to estimate MU-MIMO channel parameters. The pilot signal could be added to the transmitted MU-MIMO signal 117A at a lower power so as not to interfere with its demodulation. For instance, if the transcoded signal requires 7 dB of SNR to properly process, if the pilot power is set 10 dB below the transcoded signal both signals may be transmitted and properly received even if simultaneously transmitted in the same band. Additional techniques such as multi-user detection can be applied to isolate the pilot signals from each transmitter and remove them from the received MU-MIMO signals if needed. The advantage of such an approach is that it is possible to retransmit the tactical radio signal blindly by sampling it, retransmitting it from each blue tile without fully understanding it except for its bandwidth and assumed SNR requirements, and adding the pilot signals from implementation of the MU-MIMO algorithms without bandwidth expansion. The Occupied bandwidth for the MU-MIMO signals may be the same as for the original tactical signals. If there is a greater understanding of the tactical waveform being transmitted, features of the signal such as a preamble may also be used to assist with implementing the MU-MIMO processing.

In accordance with one aspect of the present disclosure, an exemplary network-centric or computer-centric problem solved by the MU-MIMO system 110 may sometimes contain two separate problems that need to be considered. The first is how the MU-MIMO system 110 beamforming is accomplished and the second is how is the signal is encoded for the most efficient transmission and adequately recreate the signal 117 that is received by the data sink 118. One example would be brute force in which the signal is brought in and it is blindly turned into a digital signal, and under Shannon's Law, the signal is represented and transmitted across the network. In another exemplary solution, rather than brute force, a specific application may be applied based on the signal 117 type. For example, if a Link 16-type signal is used or a Common Data Link (CDL) or Digital Video Broadcast (DVB) type signal is used, then the brute force technique makes the MIMO problem more difficult. Therefore, with as little knowledge as possible, the system wants to encode the signal with as few bits as possible while still enabling reconstruction. The techniques for CDL encoding and the techniques for Link 16 encoding are discussed in greater detail herein.

As mentioned previously, MU-MIMO is the coordinated use of multiple-user (distributed) antennas or transceivers to advantageously transfer data with higher reliability, higher throughput, or less power than the set of user antennas could transfer without coordination. One exemplary advantage of a MU-MIMO network or system 110 is that if all the signals from the antennas are coherently combined at a common antenna, they achieve a SNR gain of $N^2$ where N is the number of transmitting antennas relative to a single transmitting antenna in the network. While this power gain is of great advantage, it requires all the signals to be closely timed and then RF phases to be matched. The RF phase matching can be difficult at high frequencies and high speeds. In this particular application, the high frequencies are frequencies greater than about 2 gigahertz. One problem that needs to be overcome for high frequencies, and thus the reason that it may be difficult, is that when a platform is moving, a channel changes. Normally, a channel for the high frequencies to transmit is not stationary. Namely, movement (sometimes of the air itself) causes the frequency channel to change or respond. Thus, those changes need to be tracked in some way. The system 110 of the present disclosure is a closed loop system in that feedback is generally expected from the receiving blue ties 128 to the transmitting blue tiles 122, and as such, it must transmit all signals so they are available to each ends of the transmission chain. Stated otherwise, information from the other end of the transmission chain must be obtained in some reasonable amount of time in order to track the channel. Doing this generally feasible with cellular frequencies, for example around 400 megahertz or up to 2 gigahertz, but when the channels frequencies start to approach the upper regime above about 2 gigahertz, for example, the Ku-Band around 14 gigahertz, it is more challenging to perform the closed loop control on a signal. It is more difficult because the Doppler effect is greater. For example, if a 10 gigahertz frequency is used and needs to be tracked, the change in signal from the Doppler effect relative to a 1 gigahertz signal due to movement is a factor of 10 greater. This is also true of RF phase changes during a transmission at these frequencies. So the update rates to maintain a given level of channel estimation accuracy would increase by a factor of 10 as well. As the participants in the transmission chain get farther away from each other, it takes a longer amount of time to move the transmission signal from point A to point B. Thus, as frequencies get higher and higher, it is more difficult to track the changes in the frequency especially as the targets are father apart. Thus, the MU-MIMO system 110 of the present disclosure is designed to overcome these difficulties and be able to operate at high frequencies such as those above 2 gigahertz. It may also be applied at lower frequencies with advantage in some cases. Typically, the MU-MIMO system 110 operates at above 10 gigahertz, and in one particular embodiment, the MU-MIMO system 110 of the present disclosure is able to operate effectively in the Ku-Band at about 14-16 gigahertz.

In specific one exemplary scenario, there may be a first squad of soldiers with a plurality of radios, such as the transceivers 122 in first network 112, carried by the squad having a data set that needs to be transmitted to a recipient, such as data sink 118. The data set may reside at a single node, such as data source 116, within the squad. In this example, there may be an insufficient amount of power to transmit the data to the desired destination. The data would be transmitted to the other radios or transceivers 122 in the plurality of radios carried by the squad. The plurality of radios would then simultaneously transmit the data to the destination using MU-MIMO techniques.

In another example for a commercial setting or application, a similar example could be constructed in which there could be a set of radios for residential uses such as residential water, power, or other utility meters. The distributed network of nodes could have radio communications with other residential nodes and the desired destination could be a single recipient, such as a utility worker desiring to "read" all of the utility meters in the neighborhood or an area that is predetermined. While line of sight (LOS) may be preferred, LOS may not be required. If the system can share the data with its neighbors, then it can be cooperatively transmitted. Often time is not an issue with utility communications. So the system can distribute over multiple hops to schedule for transmission at a much future time. A "hop" might take 100 msec. If the system schedules the MU-MIMO transmission for 1 second in the future, radios 10 hops away can technically participate in the transmission.

In another example, assume a common data link (CDL) band is being used. Normally, CDL bands are used with directional antennas. For example, there may be an aircraft or other platform that has a directional antenna that is pointing at a particular area having a ground station that it wants to listen. There may be a soldier in a field, and today, if the soldier wants to use CDL, the soldier stops, opens a portable terminal, deploys an antenna, and points the antenna roughly at an area where the other platform, such as a UAV, is operating. But once the soldier sets the antenna or deploys the antenna, the soldier must remain in that fixed position until the transmission is complete, at which point he may pack up the antenna and move to another location. The present disclosure addresses this problem by being able to achieve a similar type of antenna gain but from a squad of soldiers that are moving at Ku-Band or CDL band. This will allow for greater reconnaissance and other operational measures because it provides more freedom to the squad to be able to move and transmit that data at the same time. Therefore, the squad would not be fixed and potentially in harm's way by remaining in a fixed position. What allows the soldiers carrying the transceivers 120, 122, 126, 128 to move and not be fixed in one position relates to the amount of power that is used to transmit the data. Recall in this example there is a UAV trying to receive the signal, wherein the data sink is carried by the UAV. Assume the UAV is 10 kilometers away from the squad of soldiers. In order to close the loop and transmit a signal that distance, there must normally be a significant amount of power. One way to make up for power is by increasing antenna gain. In this situation, assume a round number of around 10 dBi gain. This means that the antenna can transmit at 10 dB less power to communicate the same range and rate. Thus, if the antenna is an omnidirectional antenna that needs to transmit 10 kilometers, the link budget may indicate that 50 watts of power were needed. If the antenna in an advantageous location and orientation, then it would only need 5 watts of power because it focuses all of the energy and therefore, it does not radiate all directions. Now it is radiating in one direction and can focus its energy at the target and the same amount of power is not required because it is focused. In this example, if that antenna is removed, then 50 watts would then be required again to close the link, which may not be feasible. This creates a problem as the soldiers carrying a battery for 50 watts of power is significant in size, weight and power. This exemplary problem is cured with the MU-MIMO system 110 of the present disclosure. With continued reference to this example, assume that there are ten soldiers in the squad. Each of the soldiers can carry a radio or transceiver that only needs to transmit 5 watts each without a directional antenna. This enables greater mobility. Thus, using the MIMO techniques disclosed herein would allow a squad to use a MIMO antenna that does not need to be pointed at anything and auto calibrates with each other and then after calibration is complete, each radio may transmit about 5 watts and the information is shared on a local area network then all of the antennas may be transmitted at the same time up to the signal recipient, which in this case is the UAV using only 5 watts each.

While the examples given above related to a tactical scenario, commercial applications are equally possible. In a commercial environment, applying the internet of things (IOT) operating at about 2.4 gigahertz band, there may be a wireless meter reading application for utility companies. In traditional meter reading applications, there is a utility worker that must actively read the utility meter on the side of each building. The MU-MIMO system 110 of the present disclosure allows for a utility worker to do a wireless reading of the houses in an area so that they may drive by a neighborhood and collect all the meter readings at once. Typically, utility companies place WIFI or other protocols on their meters, similar to a private network, to allow a utility worker to drive by with a truck and read the utilities consumed by the building. In this scenario, the meter will be able to directly reach the utility company without sending the truck out to read the meters at all. Typically, this would require a lot more power if the signals were trying to reach the closest relay, such as a cellular tower. This creates issues as the meters probably do not have enough power to reach the next cell tower and it might create multipath because they are located close to the ground; however, the meter is likely close enough to reach the house next door to it or the house across the street. Thus, the MU-MIMO system 110 and methods of the present disclosure would enable the meters on the houses to talk to each other and all pass information back and forth, they can calibrate and time their transmissions and cohere their transmissions, then the information from five or ten houses at once to the recipient, such as the cell tower. This would be accomplished by the houses constructing a MANET network and they would all share information between the meters on each respective house. Thus, each house in the group would have all of the information of the other remaining houses in the group. The houses would then coordinate when they upload that information and now they can get much more aggregate power and might be able to talk to a nearby cell tower or recipient which would then relieve or eliminate the utility companies from having to send out a truck to read all of the meters. In this example, it is assumed that all houses have a line of sight (LOS) with at least one other house. However, line of sight is not required.

In accordance with one example of instantiation of the present disclosure, the tactical signal 117 ($f_1$) from FIG. 3 needs to be transmitted and recovered as the tactical signal 117 by the receiving device (e.g., secondary transceivers 118 in second network 114) on the opposing end of the transmission band or transmission chain. Some exemplary tactical signals 117 may be HAVEQuick signals, SINCGARS signals, TSM signals, BFT2 signals, SINCGARS signals, Link 16 signals, CDL signals, DAMA signals, IOT signals, Bluetooth signals, LTE/4G/or 5G or other commercial signals. In one particular embodiment, the tactical signals may be in any frequency band less than 6 gigahertz. The signals will be transcoded through a transcoding process.

In operation and with continued reference to FIG. 3, the gold tile transceiver 120 will listen to the data source 116 or the tactical radio. The gold tile transceiver 120 converts the signal into a digital signal that can be transmitted over a MU-MIMO first network 112. The gold tile transceiver 120 may perform a partial demodulation for high link efficiency. Demodulation is advantageous because if the signal was simply sampled and not demodulated, it would require many more bits of information to be provided to the MU-MIMO first network 112. Thus, by the gold tile transceiver 120 demodulating the signal from the data source 116 or tactical radio, the MU-MIMO network will be less stressed through the reduction of bits that need to be transmitted through the MU-MIMO first network 112 to the second network 114. This optimizes the efficiency for the MU-MIMO network system 110.

In accordance with one example, the first step of transcoding is to dehop the signal. For example, Link 16 uses pulses timed at 13 microseconds on 51 frequencies at known center frequencies. If the radio 121 is wired to the gold tile 120, it can listen for cycle frequencies which identify the signal present as a Link 16 signal. It can then monitor the 51 channels for the presence of a signal. When a signal is present on one of the channels, the gold tile can note the channel as a digital number using 6 bits. The link 16 spread spectrum signal consists of 32 MSK chips. The gold tile can estimate the values of those 32 chips (bits) on the channel without specific knowledge of cryptographic keys. These 6+32 bits can then be transmitted as a representation of the link 16 pulse. Those bits if received on the other end of the MU-MIMO link will allow reconstruction of the link 16 pulse. Note that Link 16 includes considerable error protection, so if reconstruction is not perfect, the system will still work. Transmission of these bits results in a data rate of about 3 mb/s over the MU-MIMO link. By contract, the Link 16 signal uses about 250 megahertz of bandwidth. If all 250 megahertz of bandwidth were digitized at a fidelity of 8 bits, the resulting signal would require 2 gb/s of data to be transmitted over the MU-MIMO link which would be impractical. There are many other ways to digitize this 5 megahertz bandwidth and transmit it on the link 132 with varying efficiency and assumptions such as access to cryptographic variables. Thus, in accordance with the present disclosure, it is one advantage to transcode at less than 2 gigabits per second. Thus, with the transcoding, instead of transmitting 2 gigabits per second, it transmits about 3 megabits per second, which is a significant efficiency savings. The transcoded signal will be transmitted across the forward link to the receiving device which will correct any errors up to about 50%.

With respect to the long link 132, there are factors to consider. One factor is the first local area network 112 that the MIMO cloud network on the transmit side may operate at about 2.3 gigahertz or 2.4 gigahertz frequency bands. If these bands are used for the local area network, then the gold tile transceiver 120 will transmit to all the other blue tiles 122 the signal that they need to emit. The signal that the blue tile transceivers 122 need to emit is the transcoded signal from the tactical radio. Efficient distribution to the blue tile transceivers 122 is important because there is a limited capacity in the local area network. In this example, if 5 megabits per second needed to be transmitted, then the 5 megabits per second signal needs to be transmitted to all the blue tile radios or transceivers. Currently, the presumption is that all the blue tile transceivers 120 "hear" or are directly connected to the gold transceiver 120 and the gold transceiver 120 and each transmission from the gold tile locally is heard by all blue tile. Thus, it only uses 5 megabits per second of capacity of the local area network to transmit the signal to all the blue tile radios. Then, the next step is to transmit that data at a higher frequency band, such as the 5g band or 27 gigahertz band. The system 110 of the present disclosure then uses two different bands at 27 gigahertz via frequency duplexing on both the forward link 134 and the reverse link 136. Stated otherwise, the forward link center frequency is at one frequency and the reverse link center frequency is at another frequency. Then, both the forward link 134 and the reverse link 136 with their different center frequencies, run simultaneously. The two links 134, 136 that are frequency duplexed is an advantageous feature over a time duplexed system that allows more rapid response to changing channel conditions in the forward direction where it is to be detected and then retransmitted back across the same link. This adds latency. With the two links 134, 136 of the present disclosure running simultaneously and not needing to share a single frequency, there is a lot less latency. Frequency domain duplexing is an advantageous feature of the present disclosure as opposed to time domain duplexing. Thus, there are two bands, which may be 10 megahertz forward and reverse, respectively.

When the system is initiated, auto node discovery is accomplished. Similarly, session establishment is accomplished when the system is initiated. This effectively means that the networks need to discover each other. In order to sound the channel, the system 110 wants each of the blue tile transceivers 122 to transmit a different sounding code. Thus, when the system is initiated and the networks find each other, they have to negotiate to lock on to the respective codes. Once the codes are locked on, the MU-MIMO networks 112, 114 know that a link is established and they know what codes are transmitted. This can be performed on both the forward link 134 and the reverse link 136 simultaneously. Thus, the blue tile transceivers 122 on the transmit side use a first set of codes across the forward link 134, then the blue tiles transceivers 128 on the receive side can use the same set of codes on the reverse link 136 because the reverse link and the forward link are on different frequencies. The system will know which node is which code because there is a mapping of codes to nodes. Thus, the system will know which node it is listening to when it receives something on a particular code. Some exemplary codes that may be utilized in the present disclosure are Walsh codes or square wave codes. When the codes are synchronized correctly, the codes can be transmitted on top of each other and they will not interfere.

With continued reference to the codes, when a system is fully orthogonal, the codes are relatively simple to implement. However, most of the time, it is very difficult to guarantee orthogonality. Thus, the codes are designed to have low levels of interference. A typical example for this would be something called "gold codes". Gold codes are known in the literature and are codes that can accommodate some amount of mutual interference where code 1 will cause some interference with code 2. But if the codes are long enough, in accordance with coding gain, they transmit much more bits than what is actually required. For example, if 1 bit needs to be transmitted, the coding gain will be on the order of a thousand bits. One problem that arises is where to place or how to handle these thousand bits of coding information. Essentially, there are two choices. First, the transmission could be slowed down so that each one of the respective thousand bits is transmitted at a time period similar to the information rate of the data to be carried. Or, the second option is that the frequency is increased during the time period at 1 bit which allows for a thousand different code bits to be transmitted in the time of one data bit. Thus, if 1 megahertz was needed before to carry the information between the tactical terminals, then the system now needs a thousand megahertz for the coded pilot signals. While a thousand megahertz sounds like a lot of information, there are many spread spectrum systems currently in the art that will transmit a thousand megahertz. Another factor that needs to be accounted for is the amount of spreading gain that is needed. One exemplary spreading gain that is available is 30 dB. The amount of spreading gain gives a certain amount of protection against other spreading codes. For example, this would provide 30 dB of protection against other spreading codes. So, for example, if two codes are transmitted that are directly on top of each other and they are both spread out, what happens is that the system can receive one code 20 dB louder than the other code but there will still be enough spreading gain that the system can demodulate both codes because they are protected against each other by the spreading.

By listening to feedback on the reverse link, nodes can be given a target signal level and feedback as to what level their codes are received at to enable them to adjust levels and avoid overwhelming other codes. It is also possible to use techniques such as multi-user detection and successive cancellation to reduce the impact of very loud codes. Generally 30 dB of dynamic range between the softest and loudest code should be achievable without impairing the operation of any code. The system can still operate with less dynamic range with dynamic range of 10 dB or less being acceptable. In systems without feedback on a reverse link the blue tiles can coordinate locally to ensure their signal levels in a direction of interest when received are at a similar signal level in dBm. In this example, the blue tile radio transceivers that are on the transmitting side each have a different code and they all transmit at the same time in the same band. In this example, they would each be in the 10 megahertz band up and down (i.e. forward link and reverse link). The system will then transmit at a low enough data rate, such as on the order of a few kilobits, to initiate the link. Thus, all 10 signals are active at one time, each operating on a different code. On the receiver side FIG. 3, the blue tile receivers are looking for these codes.

With continued reference to this example, the blue tile transceivers 128 on the receiving end are listening to the codes transmitted by the blue tile transceivers 120. The blue tile transceivers 128 begin to figure out which code it is receiving at which phase and at which amplitude. One presumption this example takes into account is that when the system is operating at 27 gigahertz, some of the channel effects ignored. This is because 27 gigahertz is likely not used for squad to squad communication in a military sense. This is because 27 gigahertz does not propagate very well in that scenario where all receivers are near the ground. A scenario where it may be beneficial though, would be from a squad to an aircraft. Thus, if the blue tile transceivers were on a platform of an aircraft, then the 27 gigahertz is a frequency that operates well with the methods and protocols and algorithms provided herein. In this example, the aircraft would have an array of blue tile transceivers that can be placed anywhere on the aircraft or platform and it will behave or act as a squad of soldiers.

Then, a calibration may occur. Generally two regimes of operation are possible—one where the timing, phase, and frequency of the data signals from blue tiles are tightly controlled at a single antenna, and a regime where they are loosely controlled. In the tightly controlled scenario using a single antenna, a signal to noise ratio (SNR) gain of N-squared may be achievable where N is the number of signals and the improvement is relative to the SNR achievable for a single transmitter. While this may be very desirable, it is difficult to achieve at high frequencies. Generally it is required to have a feedback channel that enables each transmitting terminal to correct frequency, phase and timing very rapidly to maintain synchronization at the antenna on the air platform. The higher the frequency, the faster these parameters vary relative to lower frequencies. Also the faster the air platform is moving, the faster they vary, and the further away the air platform is, the longer the timing loop that must be accommodated to synchronize the system. While some prediction of parameters is possible to ameliorate these issues, ultimately (at some frequency) the vagaries introduced become insurmountable and operation in this regime is no longer possible. Further, it can be shown that the signals in general can only maintain their required phasing for N-squared operation at a single point in space (Assume each transmitting blue tile only has one antenna). If multiple antennas will be used on the air platform it is not possible to maintain the required phasing at each antenna, unless each blue tile has a corresponding number of antennas on the ground. Thus the N-squared regime is generally impractical at higher frequencies with moving platforms. However using multiple antennas in the air, equivalent performance may be achieved to a single antenna operating in an N-squared regime.

In generally there are two types of phasing that should be considered—(i) phasing of the information rate, and (ii) phasing of the carrier. So if a carrier of 30 GHz (3E10 Hz) is used, and the speed of light is $3 \times 10^8$ (3E8) meters/second, one would expect the phase of the carrier to vary over 2-pi (a full cycle) in 1 centimeter—3E8 meters per second (the speed of light) divided by 3E10 Hertz—the carrier frequency. Maintaining calibration to this level across an array of antennas is very difficult. On the other hand if one were to consider the rate at which the information symbols are changing (for example, 10 mega-symbols/second or 1E7 MS/s) one would now find that a single bit of information (and corresponding changes in the signal) are distributed across 30 meters (3E8 meters per second/1E7 MS/s). So if an array of antennas are relatively close together (say within a meter) while the system might not be able to exactly time the phase of each signal at each antenna, if it is loosely timed so that the information signal is roughly the same from each transmitter (but perhaps off by some fraction of the information symbol period) then one would expect that the signals can be processed appropriately so as to identify them and phase them so that they can be advantageously combined across antennas.

For example, there may be 10 signals from the transmitting tiles that are timed to have a timing accuracy of 10% of the information symbol period at the antennas on the aircraft. One would expect the information signal value at each of the antennas to be roughly the same, and that only the carrier value is varying. If there are 10 antennas and 10 signals where the carrier imparts an unknown complex multiplier on the signal, if one can estimate the values of those multipliers, one can then solve for the unknown signal. By embedding the pilot signal along with the primary signal, the receivers associated with the antennas on each aircraft can estimate the modulating carrier values for each of the 10 signals at each of the 10 antennas. Then matrix algebra can be used to solve for the unknown signal. In this way, the transmitted signal may be recovered without a feedback loop of any kind. Ideally (since 10 signals are present at each antenna, and 10 antennas are aggregated) one would expect a 100 times improvement in signal strength versus the use of one transmit and one receive antenna. However, in the N-squared regime using a single antenna there is one instance of receiver noise, but here each receiving antenna has an instance of receiver noise that must be aggregated to aggregate the signals. So while for the signal we expect a potential factor of 100 improvement, we anticipate that the noise may increase 10 fold as well. So the signal to noise ratio of improvement would only be a factor of 10. While not a factor of 100, operation in the N-squared regime is generally not feasible and an improvement of 10 is still very useful.

One may also compare this to operation of a 10 antenna array with a single antenna transmitting. Here, one can combine the signals on each array for a 10 fold improvement in signal strength. However as shown before, each receiving antenna also introduces receiver noise, so one can expect an increase on noise by a factor of 10 as well. However, since the signal is coherently combined, and the noise does not combine coherently, one would predict the actual SNR gain to only be square-root of 10.

In addition to timing and phasing of the signals, another difficulty that needs to be addressed in the calibration is the Doppler effect. Typically, multipath is not a significant problem at higher frequency bands unless there is a very low grazing angle. But, frequency offset due to differences in local oscillator frequencies and relative motion between transmitter and receiver may occur. To ameliorate the Doppler effect, the timing of the signals needs to be accurately calibrated. The timing of the signals are calibrated by demodulating the spread codes. The demodulation of the code will be able to detect, based on the signal processing, the rough timing of the signal. It is then often necessary to estimate the frequency offset from the expected center frequency and this is expected to be mostly due to Doppler. Once the Doppler is established, it may be counteracted by mixing it with a frequency opposite in value of the Doppler at baseband to nullify the Doppler effect. This will obtain the transmitted signal without any Doppler. Then, the blue tile transceivers determine the precise time, amplitude and phase of the signal that has been compensated for the Doppler effect. once the phase and amplitude are known, the MU-MIMO techniques can be applied. The MU-MIMO approach employs the knowledge of the phase and amplitude of the signal by sharing it with all of the other antennas, especially if they are on the same platform. Once the phase and amplitude of each respective antenna has been shared, the group of antennas are able to construct a beam with those antennas to each individual transmitting antenna to separate up to the number of antennas that are receiving. Thus, if there are five antennas or transceivers on a platform, then it can separate five signals. If there were ten antennas or transceivers, then it would be able to separate 10 signals. Notably, the Doppler effect should be roughly or approximately the same for each one of the respective transmitting and receiving blue tile transceiver pairs 122/128 because the receiving times 128 are all moving together when they are mounted on the same platform, and the transmitting tiles relatively close together on the ground. Once the signals have been filtered so the Doppler is removed, the signals may be combined via signal processing techniques, namely, sparse array techniques so that each of the individual transmissions can be separated from each other. Effectively, the system uses the CDMA in order to sound the channel to determine the correct sparse array weights.

With continued reference to this example and the operation of FIG. 3, the pilot signal 137 is always present. Pilot signals, or a pilot signal 137, is/are transmitted and received by the blue tile transceivers 128. The blue tile transceivers 128 on the receiving end share the relative phase and timing of each of the pilot signals. Now, for an example where the blue tile transceivers are on an aircraft or other platform, they would form a sparse beam 133 after separating the signals based on the pilot signals. The ten sparse beams are formed to each individual radio using sparse beam-forming techniques. This is done by listening to the pilot signal 137, and based on the pilot signal 137, the transceivers 128 knows the phase and amplitude in order to form a beam 133 that isolates each radio independently. The ten beams 133 are independent and now that the beams are independent, then, these ten beams or however many beams that are present in the system based on the number of blue tile antenna radios, may be combined into a single beam because the system knows that they are all transmitting the same signal. For the spare beam to each Tx antenna, there should be a coherent signal gain of 10, but the noise increases by square root (sqrt) of 10. So the gain is SNR should be sqrt(10). Then the ten signals are combined making the total gain of 10. One should expect the ten noise factors in the final combining to act as independent noise sources and not combine coherently. Thus, what should be obtained is 10 sqrt(10)/sqrt(10), and the net SNR gain is 10, while the raw signal gain is 100. This establishes the full effective gain of the system. Thus, the present disclosure provides a two-step beam-forming process where individual beams are formed to each of the individual radios using the pilot signal, and then once those individual beams are formed, they are then combined into one beam to get the full $N^2$ array factor with the caveat that there is also increased noise that must be accounted.

With continued reference to FIG. 3, there are at least two scenarios for exemplary instantiations of the present disclosure. The first scenario is an airborne scenario and the second scenario is a ground-based scenario. The airborne scenario is where all the receive antennas are connected together on a platform such as an airplane. The receive antennas or transceivers 128 form a connected MU-MIMO antenna which is advantageous because the MU-MIMO antenna has the ability to isolate each of the individual transmissions from the ground and then combine them advantageously so as to act as if they were one transmission. However, in the second scenario for a ground-based scenario, this is more difficult to accomplish. Namely, the local area network connecting the blue tile transceivers 128 is responsible for all the nodes to share the information and the signal received at each of the antennas is different. So, if the system 110 tries to actually transmit the information to the gold receive tile or transceiver 126, it would overwhelm the receiving blue cloud because it is unlikely there would be enough capacity in the cloud for all the antennas to relay all their signals so they can be properly combined in order to pull out each of the individual signals and then recombine them as described herein. Instead, with the ground-based scenario, there is a strongest signal that is detected at each antenna. In this ground-based scenario, the strongest signal is the signal that is conveyed to the receiving gold tile transceiver 126. To do this, the pilot signals 137 are detected to determine which is strongest at each antenna, and then the synchronization of the strongest signal is favored. The signals must be synchronized through the use of the pilot signal 137 that allows the receiving nodes or transceivers 128 to listen to the transmit nodes or transceivers 122 to figure out the channel between the two local area networks 112, 114 and how the channel is different for each node. This then enables proper synchronization of the strongest signal at each BT antenna 128 when retransmitted to the GT 126.

With continued reference to this example in FIG. 3, if reference is made to the first blue tile transceiver 128A in the second network 114, this blue tile receiving radio will hear all of the signals from the blue tiles transmitted from the transmit blue cloud local area network or first network 112. This lead blue tile transceiver 128A will figure out what are the channel parameters for each of the codes, namely, what are the channel parameters for each code such as how much delay, what coherent phase it is being received at, and the like. Based on these parameters, it will be able to determine which radio from the transmit side or first network 112 has the strongest link. Thus, the lead blue tile transceiver 128A will focus in on the strongest signal from the transmit blue cloud local area network 112. This is distinguishable from the older approach which used a closed loop system to allow the blue tile receive radios to transmit along the reverse link to tell the transmit radios what phase that the receive radio is receiving the signal at and what time delay the receive radio is receiving the signal so that the blue transmit radios can adjust their transmissions so that the blue tile receive radios receive all the transmissions at the same time in the same phase so as to create a closed loop. However, in the second scenario with the ground-based application, this can be altered or eliminated. Instead of the closed loop analysis, each of the blue tile receivers 128 or at least one of the blue tile receivers, can identify which blue tile transmitter 122 is transmitting the strongest signal 117. Then, the blue tile receive antennas communicate to the gold tile transceiver 126 and indicate that while they cannot transfer all of the received signals to the gold tile but they will send the gold tile receive antenna the signals with one particular signal favored, and request from the gold tile receive antenna information as to what phase and time delays should be used so that it will combine coherently with the other signals from the blue tile receivers. Thus, as shown in FIG. 3, each of the blue tile receivers 128 can form a beam 133 to direct the beams towards the gold tile receiver 126. Thus, rather than coherently combining the signals from the transmit side and transmitting it across the forward link 134, the system 110 of the present disclosure is able to receive all the signals then form a beam in the receiving end of the local area network to transmit and form beams that may be coherently combined at the gold tile transceiver based on the best signal they are hearing with the right phase and amplitude for them to coherently combine at the gold tile receiver. This adds a simple solution to a relatively complex problem because relative to each other, the blue tile receive antennas are not moving very much. Further, the blue tile receivers 128 are likely closer to each other and moving at low speeds which makes the transmission and beam forming between them more simple. Additionally, the beam forming will occur at a lower frequency around 2.3 gigahertz or 2.4 gigahertz instead of the 5g band of 27 gigahertz. Further, if the blue tile receivers are networked at a WIFI band such as 2.4 gigahertz, the beam forming may occur at a different, lower frequency band, such as 2.3 gigahertz so that the signals do not interfere with each other. Then, the gold tile transceiver can figure out how to assemble the coherent signals. One exemplary way for the gold tile transceiver to assemble the coherent signals is the same number of antennas equal to number of beams created by the blue tile receivers.

A possible concern with the method just described is that the other signals received at each antenna (not just the strongest signal) are still present when transmitted to the gold tile and may create a great deal of interference for receiving the strongest signal. This can be addressed through the use of cancellation techniques. With reference to FIG. 4, signal processing 150 cancels signals other than the desired signal at each receiving antenna. Signals received at the blue tile receiver 152 can be passed to a detector 154 that detects the codes and determines there relative phase and delays and if necessary Doppler. Once these are known, since all the signals are the same, the strongest signal (or perhaps first signal to arrive) may be used to in part cancel the undesired signals to an acceptable level. This is done by developing a set of weighs and delays 156 which may be applied such that the first or strongest transmitted signal is used to cancel copies of the other signals received by setting the weights W1-W4 to exactly opposite the computed phase of the received signals from other transmitters. If necessary frequency adjustments to account for Doppler can be made too. In this way the strongest/most desired signal may be isolated prior to transmission for combining at the gold tile.

An exemplary method of system 110 references the blue tile transceivers 122 transmitting signal 112 along forward link 134. For this example, each transceiver 122 uses a resource (time slot, frequency, or spreading code) to transmit a control signal unique to its transceiver to each blue receive tile transceiver 128. Spreading codes (such as DSSS using gold codes and BPSK or QPSK) could be beneficial. Chaotic signaling and frequency hopping are other possible spreading methods. In one exemplary spreading method, all control signals are at a common center frequency and spread. This allows for reduced spectral use but creates multiple access interference complicating signal processing. In another spreading method, all control signals are at different frequency or time slot allowing simplified signal processing. When commanded by transmitting primary gold tile transceiver 120, the blue tile transceivers 128 transmit data for beamforming. Based on reverse link 136 feedback from blue receive tiles, the transmit transceivers 120 may adjust phase and time to beamform to a particular tile requiring high accuracy in phase and time. They could also try and optimize the signal at a set of receiving BT 128—but optimizing for a single best situated receiving BT is currently considered most optimal. Alternatively, it could be accomplished when only approximate timing accuracy (e.g. <10 microseconds) and no particular phase accuracy is required.

With continued reference to the blue tile transceivers 122 transmitting signal 112 along forward link 134, when data transmission begins, the data is overlaid on the control signal or pilot signal 137 using the same resource and synchronized with known RF phase and timing relative to the control signal. The control signal or pilot signal 137 is spread such that it can be recovered and removed from the data signal via cancellation techniques (such as successive interference cancellation, SIC) on reception. Blue tiles transceivers 128 may use multiple antennas and may partially beamform on receive and transmit in specific directions.

Each receiving transceiver 128 receives pilot signals 137 to determine timing and carrier phase offset relative to local time and frequency reference for each transmitting blue tile transceiver 122. A reverse control link 136 uses the same protocols as on the forward link 134, but for one exemplary method it provides timing and phase offset info to the transmitting transceivers 122 from each receiving transceiver 128. A signal on the reverse link 136 may be used to form a bidirectional link between 122A, 122B . . . 122N and 128A, 128B . . . 128N with a symmetric set of access protocols used.

In an exemplary method, the pilot signal 137 or control signals are decoded and cancelled from the received signal path leaving the data signals 117. If all the transceivers are locally connected in a common radio or data source 116, the data signals from transceivers 122 are estimated by appropriately delaying and phase offsetting the signals and combining. Mutual interference exists from the other antenna signals, but is not coherently combined so it is relatively reduced. The data signals 117 are encoded (FEC/spreading) so as to accept the interference present which is dependent on the number of data signals received. The estimated signals from transceivers 122 are then coherently combined for an estimate of the transmitted data signal which is then delivered over the second network 114 to the receiving gold tile primary transceiver 126. The same technique can be applied with N transmit transceivers and M receive transceivers where M and N are integers that are normally <40. This beam forming can also be via the beamforming LAN 133 to transceiver 126.

If the data signals use orthogonal resources (for example, separate center frequencies and two transceivers, such as first transceiver 122A and second transceiver 122B share a common radio or data source 116, which may not require a gold tile primary transceiver 120, then they may be combined by adjusting for time/phase and combined without mutual interference to determine data signals from 122A, 122B then adjusted in frequency, time and phase to be coherently combined to estimate the transmitted data signal 117.

In another example, and with respect to the Long Link Reverse Link 136, the reverse link 136 is typically at a different frequency than the forward link 134 and provides status and possibly timing and phase measurement to 122A, 122B from both 128A and 128B. It may also be used as a forward link 134 in the opposite direction with the "forward link" providing status, timing and phase for the reverse link creating a symmetric set of links. Namely, reverse link 136 can provide both control and data signaling.

In yet another aspect of system 110, the secondary transceivers 128 in second network 114 can be used as beamforming signaling. A precise time/phase sync protocol can be used to beamform from the individual secondary transceivers 128, such as 128A and 128B, to the receive gold tile primary transceiver 126 with 128A and 128B transmitting at the same frequency. If another method is implemented, reduced multiple access interference could result. If only one antenna is available at the receive primary transceiver 126, then, the secondary transceivers, such as 128A and 128B pick the strongest received long link signal and selects time and phase offset to beamform at the receive primary transceiver 126 antenna. The second network 114 may include facilities to precisely measure time, frequency and phase offset between 128A, 128B and receive primary transceiver 126. The receive primary transceiver 126 may provide feedback using the data LAN to facilitate the providing of feedback. To avoid multiple access interference on the second network 113 during beamforming, orthogonal resources may be used in the same fashion as on the long link with the receive primary transceiver 126 having a single (or multiple) antenna. The same control signaling included on the long link would be used to establish phase and timing at the receive primary transceiver 126.

In yet another example, and with respect to spread spectrum usage, for long link 132, assume 5G mW bands are used (27 GHz, 28 GHz, 37 GHz or higher possible). Assume transceivers 128 can partially beam form from multiple antennas. Then, the method detects control links and optimizes received power for direction finding. Then, the method beam forms in opposite direction for complementary link. This, assumes separate long link forward/reverse center frequencies in same band. In this example, the center frequencies may be approximately −10 MHz up and −10 MHz down for initial implementation. 12 MHz each might be better if 6 MHz channelization (TV bands) are implemented, however this effectively shows that the frequencies can be adjusted based on data rate requirements. The Beam Former will accept some multiple access interference so the method can use QPSK with 1/4 rate code to ensure operation at negative SNR if needed (presume >0 dB SNR normally). This allows for 5 Mbps of data transfer at PHY layer. For beamforming it may only need one 10 MHz channel placed initially in 2.2-2.3 GHz band, which is close to 2.4 WiFi band, but it could use 1.7 or 4.5 GHz, if preferred. For WiFi, 2.4 GHz is advantageous.

The methods described thus far can be used with a variety of source encoding/decoding methods intended to reduce the data rate required over the forward link 134. The encoding and decoding would most likely be implemented in the GT 120/126. Two exemplary encoding/decoding techniques targeting specific waveforms widely used in military settings. In both cases it is assumed that radio 116 sources the signal to GT 120, and GT 126 sources the reconstructed signal to radio 118. However symmetric operation where a signal is sourced by 118, conveyed over the reverse link while a similar signal is also conveyed over the forward link is also within the scope of the invention.

The first exemplary encoding is for Link 16. Link 16 is a complex waveform with fast hopping that occupies up to −250 MHz. "Compression techniques" that reduce the data content below 10 Mb/s are desired to enable re-transmission on an multi-user multiple input multiple output (MU-MIMO) link using unclassified devices. (https://www.darpa.mil/news-events/resilient-networked-distributed-mosaic-communications-proposers-day). But Link 16 is a military waveform that includes cryptographics making it difficult to process with an unclassified device for re-transmission on an MU-MIMO link. The purpose of the method described here is to develop partial demodulation/transcoding techniques that can be performed blindly to enable transmission of Link 16 over a MU-MIMO link without direct interface with the link 16 radio (aside from access to the RF).

One can use classification techniques and power detection to determine the presence of the waveform. Namely, use a pulse train detector to determine the precise timing of the waveform. Also, use a per pulse frequency detector to detect the pulse center frequencies and use that to demodulate the pulse to baseband. Since there will be high SNR, demodulated the minimum shift keyed (MSK) sequence directly, error protect a code for the frequency of the pulse, interleave the signal if desired. Transmit the resulting digital stream at about 3.69 Mb/s. Reverse the process on the other side of the MU-MIMO link and re-synthesize the link 16 waveform.

Another exemplary encoding is for Common Data Link (CDL). CDL is a well know signal type that can vary in data rates from a couple of hundred kilobits per second to hundreds of megabits per seconds. However, a wide range of useful applications use CDL at less than 50 or even 10 megabits per second. Consequently, useful encodings of CDL for MU-MIMO transmission do exist.

CDL is a continuous wave (CW) waveform that once it starts transmitting will continually transmit for an extensive period of time. Assuming a good SNR (and no side information to simplify parameter detection), first an energy detector (to detect the presence of a signal) and then a rate detector (to determine the center frequency and symbol rate of the signal) may be used. Knowing this properties, it is then possible to determine the type of modulation present—for example QPSK or 8-PSK. Given these 3 parameters (center frequency, rate, and modulation type) it is then possible to efficiently compress the signal. Say that the signal is operating with a symbol rate of 10 megasymbols per second, and QPSK symbols are in use. Than the signal may be adequately represented with 20 megabit/second for transmission over the MU-MIMO link. By contrast, brute force mechanisms—if we sampled at 20 MHz and 8 bits/sample would require 160 megabits/second to represent the CDL signal—which would be infeasible. Note that the CDL waveform include error correction coding (ECC), so the need to perform ECC on the MU-MIMO link may be obviated.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The terms "blue" and "gold" used herein do not refer to actual colors, or properties (with respect to gold), of the transceivers. Rather, these descriptors are used to distinguish between transceivers in the first network and the second network respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A Multi-User Multiple Input Multiple Output (MU-MIMO) method comprising:
   coordinating network activity on a first plurality of blue tile transceivers from a first gold tile transceiver via a first blue cloud wireless local area network (WLAN) for data transmission;
   receiving source data for transmission via an interface at the first gold tile transceiver;
   coding the source data as compressed data for transmission on the first blue cloud WLAN to the first plurality of blue tile transceivers;
   sending coordinated transmissions of the compressed data as link data from the first plurality of blue tile transceivers to facilitate reception of the data at a second plurality of blue tile transceivers;
   synchronizing at least one of time, frequency and phase of the data received at the second plurality of blue tile transceiver into synchronized data;
   transmitting the synchronized data from the second plurality of blue tile transceivers over a second blue cloud WLAN; and
   beamforming a signal representing the synchronized data to a second gold tile transceiver adapted to transfer the data from the first gold tile transceiver to the second gold tile transceiver via the first plurality of blue tile transceivers and the second plurality of blue tile transceivers.

2. The MU-MIMO method of claim 1, further comprising:
   transmitting link data symmetrically between the first blue cloud WLAN and second blue cloud WLAN along at least one forward long link and at least one reverse long link adapted to effectuate bi-directional transfer of the data between the first gold tile transceiver and the second gold tile transceiver; and
   transmitting synchronizing data along the at least one reverse long link adapted to increase accuracy of at least one of time, frequency and phase of data transmitted along the at least one forward long link to one of the blue tile in the second plurality of blue tile transceivers.

3. The MU-MIMO method of claim 1, further comprising:
effectuating different spread spectrum signals and a common data signal to be on one frequency to assist in synchronizing the at least one of time, frequency and phase of the data received at the second plurality of blue tile transceiver; and
wherein spreading codes are received at the second plurality of blue tile transceivers and deciphered to determine one or more of time, frequency and phase of the data signals received and used to combine the synchronized data signals into a single combined data signal to be transmitted to the second gold tile transceiver.

4. The method of claim 3, further comprising:
using a strongest of the data signals to reduce noise from multipath from less strong signals transmitted along the long link for processing at the second gold tile transceiver.

5. The MU-MIMO method of claim 1, further comprising:
effectuating different spread spectrum signals and a common data signal to be on different center frequencies to assist in synchronizing the synchronized data in at least one of time, frequency and phase of the data received at the second plurality of blue tile transceivers.

6. The MU-MIMO method of claim 1, further comprising:
separating transmission from the first plurality of blue tile transceivers in separate time slots;
detecting the synchronized data at each of the blue tile transceivers in the second plurality of blue tile transceivers after having been separated in separate time slots;
weighting at least one remaining data signal at one blue tile transceiver in the second plurality of blue tile transceivers to favor a strongest signal at each blue tile transceiver in the second plurality of blue tile transceivers;
adjusting phase frequency and transmission time of the strongest signal received at each blue tile transceiver in the second plurality of blue tile transceivers;
transmitting the adjusted strongest signal from each tile the second plurality blue tile transceivers to the second gold tile transceiver.

7. The MIMO method of claim 6, further comprising:
connecting the second plurality of blue tile transceivers to a common signal processor;
detecting the link data at each of the blue tile transceivers in the second plurality of blue tile transceivers;
canceling the synchronized data;
frequency adjusting the data received at each of the blue tile transceivers in the second plurality of blue tile transceivers to a common time reference;
combining, coherently, the data received at each of the blue tile transceivers in the second plurality of blue tile transceivers to maximize signal quality of the received data and minimize multiple access interference.

8. The MU-MIMO method of claim 6, further comprising:
detecting the link data at each of the blue tile transceivers in the second plurality of blue tile transceivers after effectuating the different spread spectrum signal on different center frequencies;
canceling the synchronized data;
weighting at least one remaining data signal at one blue tile transceiver in the second plurality of blue tile transceivers to favor a strongest signal at each blue tile transceiver in the second plurality of blue tile transceivers;
adjusting phase and transmission time of the strongest signal received at each blue tile transceiver in the second plurality of blue tile transceivers;
transmitting the adjusted strongest signal from the second plurality blue tile transceivers to the second gold tile transceiver.

9. The MU-MIMO method of claim 8, further comprising:
synchronizing the at least one of time, frequency and phase of the link data received at the second plurality of blue tile transceivers to effectuate coherent combination of received data at the second gold tile transceiver.

10. The MU-MIMO method of claim 9, further comprising:
transmitting link data from the first plurality of blue tile transceivers on different center frequencies;
coherently combining the signals received at each blue tile transceiver in the second plurality of blue tile transceivers to a formed beam at a common frequency in the second blue cloud WLAN;
transmitting the synchronized data to the second gold tile transceiver;
processing the synchronized data to determine a preferred weighting and combining metric for the signal received at the second gold tile transceiver.

11. The MU-MIMO method of claim 1, further comprising:
effectuating a different spread spectrum signal on a same center frequency to assist in synchronizing the at least one of time, frequency and phase of the link data received at the second plurality of blue tile transceivers.

12. The MU-MIMO method of claim 11, further comprising:
connecting the second plurality of blue tile transceivers to a common signal processor;
detecting the link data at each of the blue tile transceivers in the second plurality of blue tile transceivers;
canceling the synchronized data;
time adjusting the data received at each of the blue tile transceivers in the second plurality of blue tile transceivers to a common center frequency; and
combining, coherently, the link data received at each of the blue tile transceivers in the second plurality of blue tile transceivers to maximize signal quality of the received data and minimize multiple access or multipath interference.

13. The MU-MIMO method of claim 12, wherein adjusting the data received at each of the blue tile transceivers in the second plurality of blue tile transceivers to a common center frequency is accomplished by:
translating the link data received at each of the blue tile transceivers in the second plurality of blue tile transceivers to arrive at the common center frequency.

14. The MU-MIMO method of claim 12, wherein adjusting the data received at each of the blue tile transceivers in the second plurality of blue tile transceivers to a common center frequency is accomplished by:
weighting and time adjusting the link data received at each of the blue tile transceivers in the second plurality of blue tile transceivers to arrive at the common center frequency.

15. The MU-MIMO method of claim 12, further comprising:
transmitting link data from the first plurality of blue tile transceivers the common center frequency;

converting a strongest signal received at the second plurality of blue tile transceivers to a formed beam at a common frequency in the second blue cloud WLAN;

transmitting the synchronized data to the second gold tile transceiver;

processing the synchronized data to determine a preferred weighting and combining metric for the signal received at the second gold tile transceiver.

16. The MU-MIMO method of claim 1, further comprising:

effectuating a synchronization header signal on a same center frequency to assist in synchronizing the at least one of time, frequency and phase of the link data received at the second plurality of blue tile transceivers.

17. A Multi-User Multiple input Multiple Output (MU-MIMO) system comprising:

a data source;

a first network comprising a first gold tile transceiver and a first plurality of blue tile transceivers, and the first gold tile transceiver in operative communication with the data source;

network links in the first network that establish a first wireless local area network (WLAN) for data transmission between the first gold tile transceiver and the first plurality of blue tile transceivers that are adapted transmit link data derived from source data from the first gold tile transceiver received from the data source;

a data sink;

a second network comprising a second gold tile transceiver and a second plurality of blue tile transceivers, and the second gold tile transceiver in operative communication with the data sink;

a long link wirelessly coupling the first plurality of blue tile transceivers to the second plurality of blue tile transceivers;

network links in the second network that establish a second WLAN for link data reception at the second plurality of blue tile transceivers that are adapted receive link data from the first plurality of blue tile transceivers and provide the link data to the second gold tile transceiver as synchronized data for transmission to the data sink;

wherein the second plurality of blue tile transceivers beam form data to the second gold tile transceiver.

18. A Multi-User Multiple input Multiple Output (MU-MIMO) method comprising:

coordinating network activity on a first plurality of blue tile transceivers from a first gold tile transceiver via a first blue cloud wireless local area network (WLAN) for data transmission;

receiving source data for transmission via an interface at the first gold tile transceiver;

coding the source data as link data for transmission on the first blue cloud WLAN to the first plurality of blue tile transceivers;

sending coordinated transmissions of link data from the first plurality of blue tile transceivers to facilitate reception of data at least one second blue tile transceiver, wherein the first plurality of blue tile transceivers uses different center frequencies for each respective transmission;

synchronizing at least one of time, frequency and phase of the link data received at the at least one second blue tile transceiver to generate synchronized data; and transmitting synchronized data from the at least one second blue tile transceiver over a second blue cloud WLAN network.

19. The method of claim 18, further comprising:

beam forming a signal representing the synchronized data to a second gold tile transceiver adapted to transfer the data from the first gold tile transceiver to the second gold tile transceiver via the first plurality of blue tile transceivers and the at least one second blue tile transceiver.

20. The MU-MIMO method of claim 18, further comprising:

transmitting link data symmetrically between the first blue cloud WLAN and second blue cloud WLAN along at least one forward long link and at least one reverse long link adapted to effectuate bi-directional transfer of link data between the first gold tile transceiver and the second gold tile transceiver; and transmitting link data along the at least one reverse long link adapted to increase of accuracy one of time, frequency and phase of data transmitted along the at least one forward long link to one of the blue tile in the second plurality of blue tile transceivers.

21. The MU-MIMO method of claim 18, further comprising:

effectuating different spread spectrum signals and a common data signal to be on one frequency to assist in synchronizing the at least one of time, frequency and phase of the link data received at the second plurality of blue tile transceivers; and wherein spreading codes are received at the second plurality of blue tile transceivers and deciphered to determine one or more of time, frequency and phase of the link data received and used to combine the data signals into a single synchronized data signal to be transmitted to the second gold tile transceiver.

22. The MU-MIMO method of claim 21, further comprising:

using the strongest synchronized data signal to reduce noise from multipath from less strong signals transmitted along the long link for processing at the second gold tile transceiver.

23. The MU-MIMO method of claim 18, further comprising:

effectuating different spread spectrum signals and a common data signal to be on different center frequencies to assist in synchronizing the at least one of time, frequency and phase of the link data received at the second plurality of blue tile transceivers.

24. The MU-MIMO method of claim 18, further comprising:

separating transmission from the first plurality of blue tile transceivers in separate time slots;

detecting the link data at each of the blue tile transceivers in the second plurality of blue tile transceivers after having been separated in separate time slots;

coherently combining the synchronized data;

weighting at least one remaining data signal at one blue tile transceiver in the second plurality of blue tile transceivers to favor a strongest signal at each blue tile transceiver in the second plurality of blue tile transceivers;

adjusting phase frequency and transmission time of the synchronized signal received at each blue tile transceiver in the second plurality of blue tile transceivers; and transmitting the adjusted synchronized signal from the second plurality blue tile transceivers to the second gold tile transceiver.

25. The MU-MIMO method of claim 24, further comprising:
- connecting the second plurality of blue tile transceivers to a common signal processor;
- detecting the link data at each of the blue tile transceivers in the second plurality of blue tile transceivers;
- canceling the synchronized data;
- frequency adjusting the link data received at each of the blue tile transceivers in the second plurality of blue tile transceivers to a common time reference; and
- combining, coherently, the synchronized data received at each of the blue tile transceivers in the second plurality of blue tile transceivers to maximize signal quality of the received data and minimize multiple access interference.

26. The MU-MIMO method of claim 24, further comprising:
- detecting the link data at each of the blue tile transceivers in the second plurality of blue tile transceivers after effectuating the different spread spectrum signal on different center frequencies;
- canceling the synchronized data;
- weighting at least one remaining data signal at one blue tile transceiver in the second plurality of blue tile transceivers to favor a strongest signal at each blue tile transceiver in the second plurality of blue tile transceivers;
- adjusting phase and transmission time of the strongest signal received at each blue tile transceiver in the second plurality of blue tile transceivers; and
- transmitting the adjusted strongest signal from the second plurality blue tile transceivers to the second gold tile transceiver.

27. The MU-MIMO method of claim 23, further comprising:
- synchronizing the at least one of time, frequency and phase of the link data received at the second plurality of blue tile transceivers to effectuate coherent combination of coherently combined synchronized data at the second gold tile transceiver.

28. The MU-MIMO method of claim 27, further comprising:
- transmitting data from the first plurality of blue tile transceivers on different center frequencies;
- frequency converting a strongest signal received at the second plurality of blue tile transceivers to a formed beam at a common frequency in the second blue cloud WLAN;
- transmitting the synchronized data to the second gold tile transceiver; and
- processing the synchronized data to determine a preferred weighting and combining metric for the signal received at the second gold tile transceiver.

29. A Multi-User Multiple input Multiple Output (MU-MIMO) system comprising:
- a data source;
- a first network comprising a first gold tile transceiver and a first plurality of blue tile transceivers, and the first gold tile transceiver in operative communication with the data source;
- network links in the first network that establish a first wireless local area network (WLAN) for data transmission between the first gold tile transceiver and the first plurality of blue tile transceiver that are adapted transmit data from the first gold tile transceiver received from the data source;
- a data sink;
- a second network comprising a second gold tile transceiver and at least one second blue tile transceiver, and the second gold tile transceiver in operative communication with the data sink;
- a long link wirelessly coupling the first plurality of blue tile transceivers to the at least one second blue tile transceiver, wherein the first plurality of blue tile transceivers uses different center frequencies for each respective transmission; and
- at least one network link in the second network for data reception at the at least one second blue tile transceiver that is adapted receive data from the first plurality of blue tile transceivers and provide the data to the second gold tile transceiver for transmission to the data sink.

* * * * *